United States Patent
Lee et al.

(10) Patent No.: US 12,307,805 B2
(45) Date of Patent: *May 20, 2025

(54) DISPLAY DEVICE WITH INTEGRATED OPTICAL TOUCH AND FINGERPRINT SENSING

(71) Applicant: SAMSUNG DISPLAY CO., LTD., Yongin-si (KR)

(72) Inventors: Cheol Gon Lee, Yongin-si (KR); Hee Rim Song, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,187

(22) Filed: Jun. 23, 2023

(65) Prior Publication Data
US 2024/0135743 A1 Apr. 25, 2024
US 2024/0233434 A9 Jul. 11, 2024

(30) Foreign Application Priority Data
Oct. 19, 2022 (KR) ......................... 10-2022-0134557

(51) Int. Cl.
*G06V 40/13* (2022.01)
*G06F 3/041* (2006.01)
*G06F 3/042* (2006.01)
*G09G 3/3233* (2016.01)

(52) U.S. Cl.
CPC ...... *G06V 40/1318* (2022.01); *G06F 3/04166* (2019.05); *G06F 3/0421* (2013.01); *G09G 3/3233* (2013.01); *G09G 2300/0426* (2013.01); *G09G 2310/08* (2013.01); *G09G 2354/00* (2013.01)

(58) Field of Classification Search
CPC ............. G09G 3/3233; G09G 2310/08; G06V 40/1318; G06F 3/04166; G06F 3/0421
See application file for complete search history.

(56) References Cited

U.S. PATENT DOCUMENTS

| | | |
|---|---|---|
| 9,600,707 B1 | 3/2017 | Ramberg et al. |
| 2021/0158751 A1* | 5/2021 | Cha .................... H10K 65/00 |
| 2021/0406508 A1* | 12/2021 | Shih .................. G06V 40/1318 |
| 2022/0190038 A1* | 6/2022 | Tada .................. G06V 40/1318 |
| 2022/0197421 A1* | 6/2022 | Lee ..................... G06F 3/04166 |
| 2023/0127696 A1* | 4/2023 | Zheng .................. G06V 40/13 345/204 |

FOREIGN PATENT DOCUMENTS

| | | |
|---|---|---|
| KR | 10-2021-0064483 | 6/2021 |
| KR | 10-2021-0114960 | 9/2021 |
| KR | 10-2021-0158592 | 12/2021 |

* cited by examiner

*Primary Examiner* — Liliana Cerullo
(74) *Attorney, Agent, or Firm* — F. CHAU & ASSOCIATES, LLC

(57) ABSTRACT

A display device includes a plurality of pixels configured to display light, a plurality of first optical sensors configured to sense the light, a plurality of second optical sensors configured to sense the light, a plurality of first scan lines respectively connected to the plurality of pixels and the plurality of first optical sensors, a plurality of second scan lines respectively connected to the plurality of second optical sensors, a first scan driver configured to output a first scan signal to each of the plurality of first scan lines, and a second scan driver configured to output a second scan signal to each of the plurality of second scan lines.

20 Claims, 18 Drawing Sheets

GWL : GWLa, GWLb

DISPLAY DEVICE WITH INTEGRATED OPTICAL TOUCH AND FINGERPRINT SENSING

CROSS-REFERENCE TO RELATED APPLICATION

This application claims priority under 35 U.S.C. § 119 to Korean Patent Application No. 10-2022-0134557, filed on Oct. 19, 2022, in the Korean Intellectual Property Office, the disclosure of which is incorporated by reference herein in its entirety.

TECHNICAL FIELD

The present disclosure relates to a display device, and more particularly to a display device having integrated touch sensing and fingerprint sensing.

DISCUSSION OF RELATED ART

Display devices are used in various electronic devices. For example, devices such as smartphones, tablets, notebook computers, monitors, and televisions (TVs) include display devices. With the recent advance of mobile communication technology, the use of portable electronic devices such as smartphones, tablets, and notebook computers has increased enormously. Private information may be stored in these portable electronic devices. Biometric information may be used to protect the private information of the portable electronic devices. For example, fingerprint authentication, in which a user's fingerprint is used as biometric information, may be used for authentication.

In the example of an authentication using a user's fingerprint, the display device may use an optical method, an ultrasonic method, a capacitive method, or the like. The optical method may authenticate the user's fingerprint by detecting light reflected from the user's finger. The display device may include a display panel having pixels for displaying an image and optical sensors for sensing light, which may be used to optically authenticate the user's fingerprint.

SUMMARY

Aspects of the present disclosure provide a display device integration touch sensing and fingerprint sensing, and thereby be capable of recognizing a user's touch position and authenticating the user's fingerprint without needing to use a separate touch panel and a separate fingerprint sensor.

Aspects of the present disclosure are not restricted to embodiments set forth herein. The above and other aspects of the present disclosure will become more apparent to one of ordinary skill in the art to which the present disclosure pertains by referencing the detailed description of the present disclosure given below.

According to an embodiment of the disclosure, a display device may comprise a plurality of pixels configured to emit light, a plurality of first optical sensors configured to sense the light, a plurality of second optical sensors configured to sense the light, a plurality of first scan lines respectively connected to the plurality of pixels and the plurality of first optical sensors, a plurality of second scan lines respectively connected to the plurality of second optical sensors, a first scan driver configured to output a first scan signal to each of the plurality of first scan lines, and a second scan driver configured to output a second scan signal to each of the plurality of second scan lines.

In an embodiment, a number of the plurality of first optical sensors may be greater than a number of the plurality of second optical sensors.

In an embodiment, a number of the plurality of first scan lines may be greater than a number of the plurality of second scan lines.

In an embodiment, the first scan driver outputs the first scan signal having a first frame frequency to the plurality of first scan lines, the second scan driver outputs the second scan signal having a second frame frequency to the plurality of second scan lines, and the second frame frequency may be higher than the first frame frequency.

In an embodiment, the display device may have a first mode for recognizing a fingerprint when the first optical sensors and the second optical sensors are turned on at a same time according to the first scan signal and the second scan signal, and a second mode for sensing a touch position the second optical sensors are turned on at a time when the first optical sensors are turned off according to the first scan signal and the second scan signal.

In an embodiment, the first scan driver outputs the first scan signal having a first frame frequency in a first mode for recognizing a fingerprint, the second scan driver outputs the first scan signal having the first frame frequency in the first mode and outputs a second scan signal having a second frame frequency in the second mode, and the second frame frequency may be higher than the first frame frequency.

In an embodiment, the display device further comprises a timing controller configured to output the second scan signal having the second frame frequency to the second scan driver.

In an embodiment, the first frame frequency may be equal to or less than 120 Hz, and the second frame frequency may be greater than 120 Hz.

In an embodiment, the display device further comprises a plurality of first read-out lines respectively connected to the plurality of first optical sensors, a plurality of second read-out lines respectively connected to the plurality of second optical sensors, and a read-out circuit connected to the plurality of first read-out lines and the plurality of second read-out lines.

In an embodiment, the read-out circuit converts first sensing signals input from the plurality of first read-out lines into first sensing data in the first mode, and converts second sensing signals input from the plurality of second read-out lines into second sensing data in the second mode.

In an embodiment, the display device further comprises a sensing controller configured to recognize a fingerprint image according to the first sensing data in the first mode and sense a touch position according to the second sensing data in the second mode.

In an embodiment, the plurality of pixels, the plurality of first optical sensors, and the plurality of second optical sensors are arranged in a first direction and a second direction orthogonal to the first direction, and any one of the plurality of second optical sensors may be surrounded by the first optical sensors in the first direction and the second direction.

According to an embodiment of the disclosure, a display device may comprise a touch sensing area comprising a plurality of touch sensing units arranged in a first direction and a second direction orthogonal to the first direction, wherein at least one of the plurality of touch sensing units comprises, a plurality of pixels configured to emit light, a plurality of first optical sensors configured to sense the light, and at least one second optical sensor configured to sense the light, wherein a number of the plurality of first optical sensors in the touch sensing area may be greater than a number of the at least one second optical sensor in the touch sensing area.

In an embodiment, the at least one second optical sensor may be disposed at one of a center of the touch sensing unit and an edge of the touch sensing unit.

In an embodiment, the at least one second optical sensor may be surrounded by the plurality of first optical sensors in the first direction and the second direction.

In an embodiment, the display device may include a read-out circuit configured to convert first sensing signal output by the first optical sensors into first sensing data and to convert second sensing signals output by the at least one second optical sensors; and a second controller configured to recognize a fingerprint image according to the first sensing data and sense a touch position according to the second sensing data.

According to an embodiment of the disclosure, a display device may comprise a plurality of pixels configured to emit light, a plurality of first optical sensors configured to sense the light, a plurality of second optical sensors configured to sense the light, a plurality of first scan lines respectively connected to the plurality of pixels, a plurality of second scan lines respectively connected to the plurality of first optical sensors, a plurality of third scan lines respectively connected to the plurality of second optical sensors, a first scan driver configured to output a first scan signal to each of the plurality of first scan lines and the plurality of second scan lines, and a second scan driver configured to output a second scan signal to each of the plurality of third scan lines.

In an embodiment, a number of the plurality of first optical sensors may be greater than a number of the plurality of second optical sensors.

In an embodiment, a number of the plurality of first scan lines may be greater than a number of the plurality of third scan lines, and a number of the plurality of second scan lines may be greater than a number of the plurality of third scan lines.

In an embodiment, the first scan driver outputs the first scan signal having a first frame frequency to the plurality of first scan lines, the second scan driver outputs the second scan signal having a second frame frequency to the plurality of second scan lines, and the second frame frequency may be higher than the first frame frequency.

In a display device according to an embodiment, since touch sensing and fingerprint sensing are integrated by an optical sensor, a user's touch position can be recognized, and the user's fingerprint can be authenticated without needing to use a separate touch panel and a separate fingerprint sensor.

Effects according to embodiments of the present disclosure are not limited to those exemplified above and various other effects are incorporated herein.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

Embodiments of present invention will now be described more fully hereinafter with reference to the accompanying drawings, in which preferred embodiments of the invention are shown. This invention may be embodied in different forms and should not be construed as limited to embodiments set forth herein. Rather, embodiments are provided so that this disclosure will be thorough and complete, and will fully convey the scope of the invention to those skilled in the art.

It will also be understood that when a layer is referred to as being "on" another layer or substrate, the layer can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of various embodiments of the present disclosure may be combined or combined with each other, in part or in whole. Embodiments may be implemented independently of each other or may be implemented together in an association.

Figure 1:
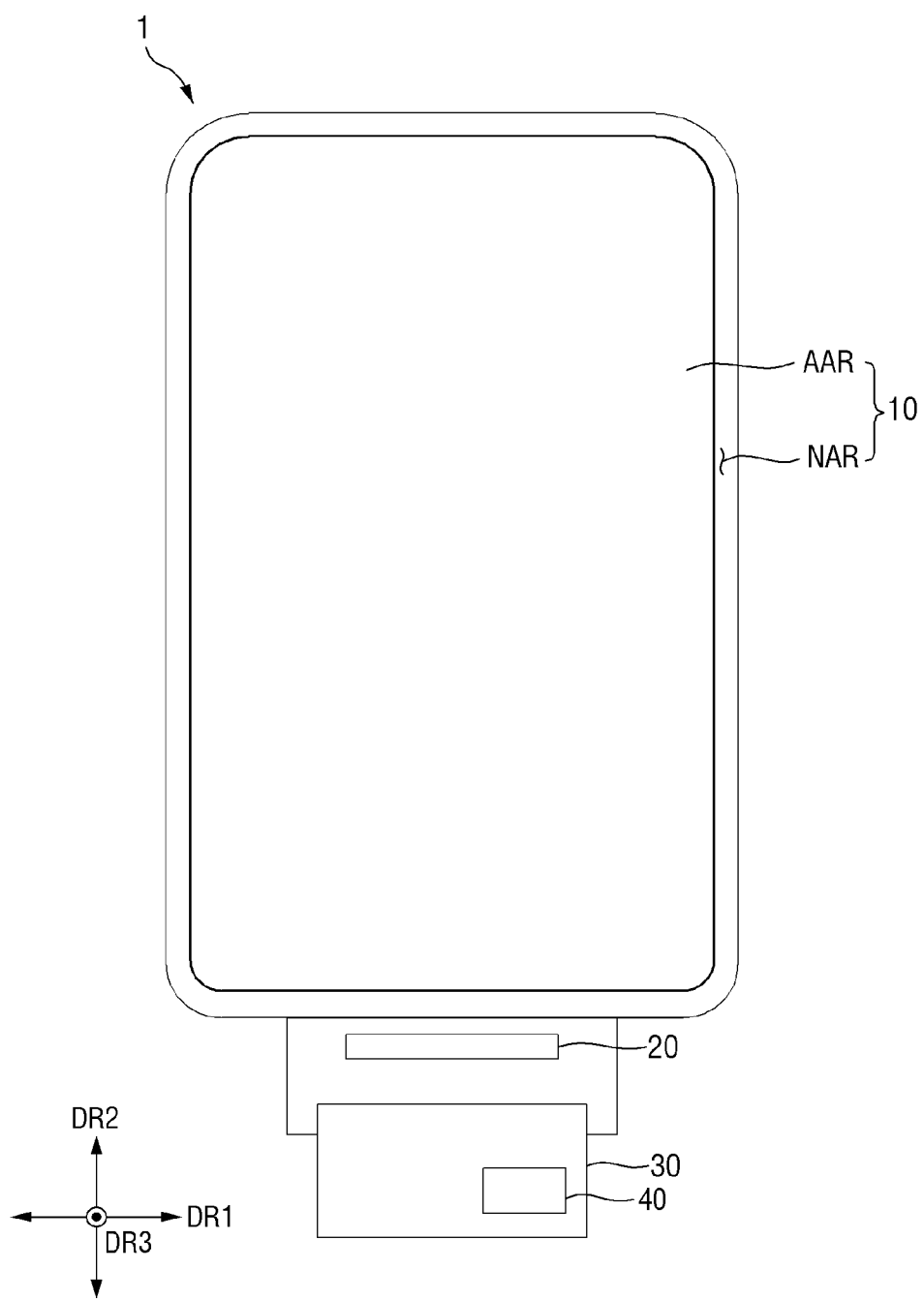
FIG. 1 is a plan view illustrating a display device according to an embodiment.

FIG. 1 is a plan view illustrating a display device according to an embodiment.

In FIG. 1, a first direction DR1, a second direction DR2, and a third direction DR3 are indicated. The first direction DR1 may be a direction parallel to one side of a display device 1 in plan view and may be, for example, a horizontal direction of the display device 1. The second direction DR2 may be a direction parallel to another side of the display device 1 in plan view and may be, for example, a vertical direction of the display device 1. Hereinafter, for simplicity of description, it is assumed that one side of the first direction DR1 refers to a rightward direction in plan view, the other side of the first direction DR1 refers to a leftward direction in plan view, one side of the second direction DR2 refers an upward direction in plan view, and the other side of the second direction DR2 refers to a downward direction in plan view, respectively. The third direction DR3 may be a thickness direction of the display device 1. It should be understood, however, that a direction mentioned in an embodiment may refer to a relative direction and that embodiments are not limited to the direction mentioned.

Unless otherwise defined, with respect to the third direction DR3, the terms "above," and "top surface" as used herein refer to a display surface's side of a display panel 10, and the terms "below," "bottom surface," and "rear surface" as used herein refer to a side opposite to the display surface of the display panel 10.

Referring to FIG. 1, the display device 1 may include various electronic devices that include a display screen. Examples of the display device 1 may include, but are not limited to, a mobile phone, a smart phone, a tablet personal computer (PC), a mobile communication terminal, an electronic notebook, an electronic book, a personal digital assistant (PDA), a portable multimedia player (PMP), a navigation device, an ultra-mobile PC (UMPC), a television, a game console, a wrist watch type electronic device, a head-mounted display, a personal computer monitor, a laptop computer, a car dashboard, a digital camera, a camcorder, an external billboard, an electric billboard, various medical devices, various inspection devices, various home appliances including a display area such as a refrigerator or a washing machine, an Internet-of-Things (IoT) device, and the like. A typical example of the display device 1 as described herein may be a smart phone, a tablet PC, or a laptop computer, but is not limited thereto.

The display device 1 may include a display panel 10, a panel driving circuit 20, a circuit board 30, and a read-out circuit 40.

The display device 1 may include a display panel 10 having an active region AAR and a non-active region NAR. The active region AAR may include a display area on which an image may be displayed. The active region AAR may completely overlap the display area. A plurality of pixels PX for displaying an image may be disposed in the display area. Each pixel PX may include a light emitting element ('EL' in FIG. 11).

The active region AAR may further include a fingerprint sensing area. The fingerprint sensing area may be a region that reacts to light, and may be configured to sense an amount or wavelength of incident light. The fingerprint sensing area may overlap the display area. For example, the fingerprint sensing area may be disposed in a limited area for fingerprint recognition within the active region AAR. In a case where the fingerprint sensing area is disposed in a limited area, the fingerprint sensing area may overlap only a portion of the display area, and may not overlap another portion of the display area. For another example, the fingerprint sensing area may be an area coincident with the active region AAR. In this case, an entire surface of the active region AAR may be utilized as an area for fingerprint sensing. A plurality of optical sensors PS, for example, including first optical sensors PS1, that react to light may be disposed in the fingerprint sensing area. Each optical sensor PS may include a photoelectric conversion element ('PD' in FIG. 11) that detects incident light and converts the light into an electrical signal.

The non-active region NAR may be disposed around the active region AAR. The non-active region NAR may be a bezel area. The non-active region NAR may surround all sides (four sides in the drawing) of the active region AAR, but is not limited thereto.

The panel driving circuit 20 may be disposed in the non-active region NAR. The panel driving circuit 20 may drive the plurality of pixels PX and/or the plurality of optical sensors PS. The panel driving circuit 20 may output signals and voltages for driving the display panel 10. The panel driving circuit 20 may be formed as an integrated circuit (IC) and mounted on the display panel 10. Signal lines for carrying signals between the panel driving circuit 20 and the active region AAR may be further disposed in the non-active region NAR. In some examples, the panel driving circuit 20 may be mounted on the circuit board 30.

Also, signal lines for applying a signal to the active region AAR or the read-out circuit 40 may be disposed in the non-active region NAR. The read-out circuit 40 may be connected to each optical sensor PS through the signal lines and may receive a current from one or more optical sensor PS to recognize a user's fingerprint input. The read-out circuit 40 may be formed as an integrated circuit (IC). The read-out circuit 40 may be attached on a display circuit board by a chip on film (COF) method, but is not limited thereto. For example, the read-out circuit 40 may be attached on the non-active region NAR of the display panel 10 by a chip on glass (COG) method, a chip on plastic (COP) method or an ultrasonic bonding method.

The circuit board 30 may be attached to one end of the display panel 10 using an anisotropic conductive film (ACF). Lead lines of the circuit board 30 may be electrically connected to a pad unit of the display panel 10. The circuit board 30 may be a flexible film such as a flexible printed circuit board or a chip on film.

The read-out circuit 40 may be disposed on the circuit board 30. The read-out circuit 40 may be formed as an integrated circuit and attached to the top surface of the circuit board 30. The read-out circuit 40 may be connected to a display layer of the display panel 10. The read-out circuit 40 may detect a photoelectric current generated by photons incident on the plurality of optical sensors (PS of FIG. 6) of the display panel 10. For example, a photon flux may be converted into a photoelectric current by the optical sensors PS, and the photoelectric current may be detected by the read-out circuit 40. The read-out circuit 40 may detect a signal for recognizing a fingerprint based on the photoelectric current.

Figure 2:
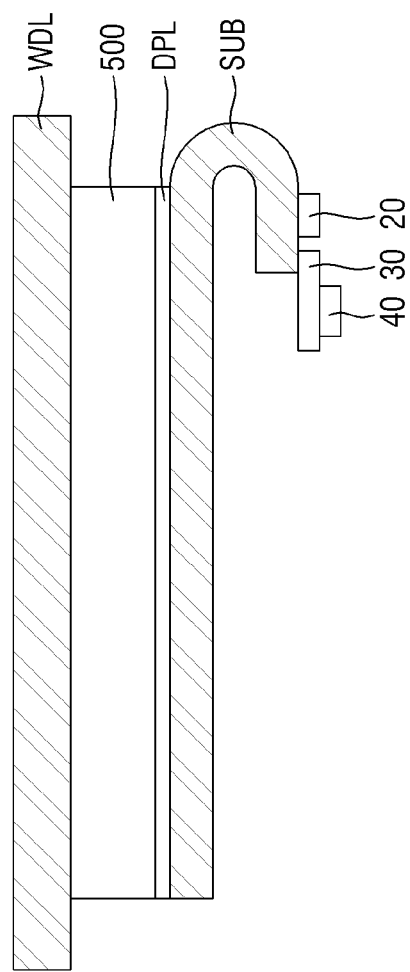
FIG. 2 is a cross-sectional view illustrating a display device according to an embodiment.

FIG. 2 is a cross-sectional view illustrating a display device according to an embodiment.

Figure 4:
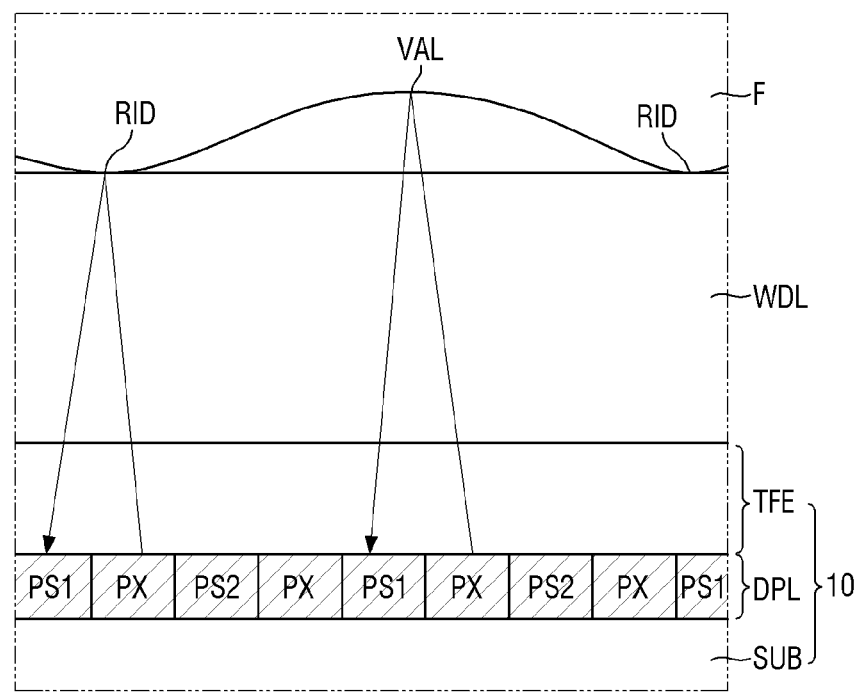
FIG. 4 illustrates fingerprint sensing of a display device according to an embodiment.

Referring to FIG. 2, the display device 1 may include a window WDL disposed on a surface of the display panel 10 (see FIG. 4). The display panel 10 may include a substrate SUB, and a display layer DPL disposed on the substrate SUB. The display device 1 may further include a transparent coupling layer 500 disposed between the display panel 10 and the window WDL.

The substrate SUB may be flexible. The substrate SUB, having flexibility, may be curved, bent, folded, or stretched. As illustrated, a lateral side of the substrate SUB may be bent in a rearward direction. For example, an end portion of the substrate SUB may be bent back on itself. A driving unit, such as the panel driving circuit 20, may be disposed at the end portion of the bent substrate SUB. The panel driving circuit 20 may be attached to a surface of the bent substrate SUB. For example, the panel driving circuit 20 may be mounted a surface of the bent substrate SUB.

The display layer DPL may be disposed on the substrate SUB. The display layer DPL may include a circuit layer, a light emitting layer, and a light receiving layer disposed on the circuit layer. The circuit layer may receive a driving signal from the panel driving circuit 20 to control the light emission amount and the light emission time of the light emitting layer. In addition, the circuit layer may transfer electric charges generated from the light receiving layer to the panel driving circuit 20. A portion of the panel driving circuit 20 may be mounted on a surface of the substrate SUB, for example, in the form of an integrated circuit, but is not limited thereto.

A transparent coupling layer 500 may be disposed above the display layer DPL, and the window WDL may be disposed above the transparent coupling layer 500. The window WDL may be coupled to the display panel 10 via the transparent coupling layer 500. As the transparent coupling layer 500, optical transparent materials such as an optically clear adhesive (OCA), an optically clear resin (OCR), and the like may be applied.

Figure 3:
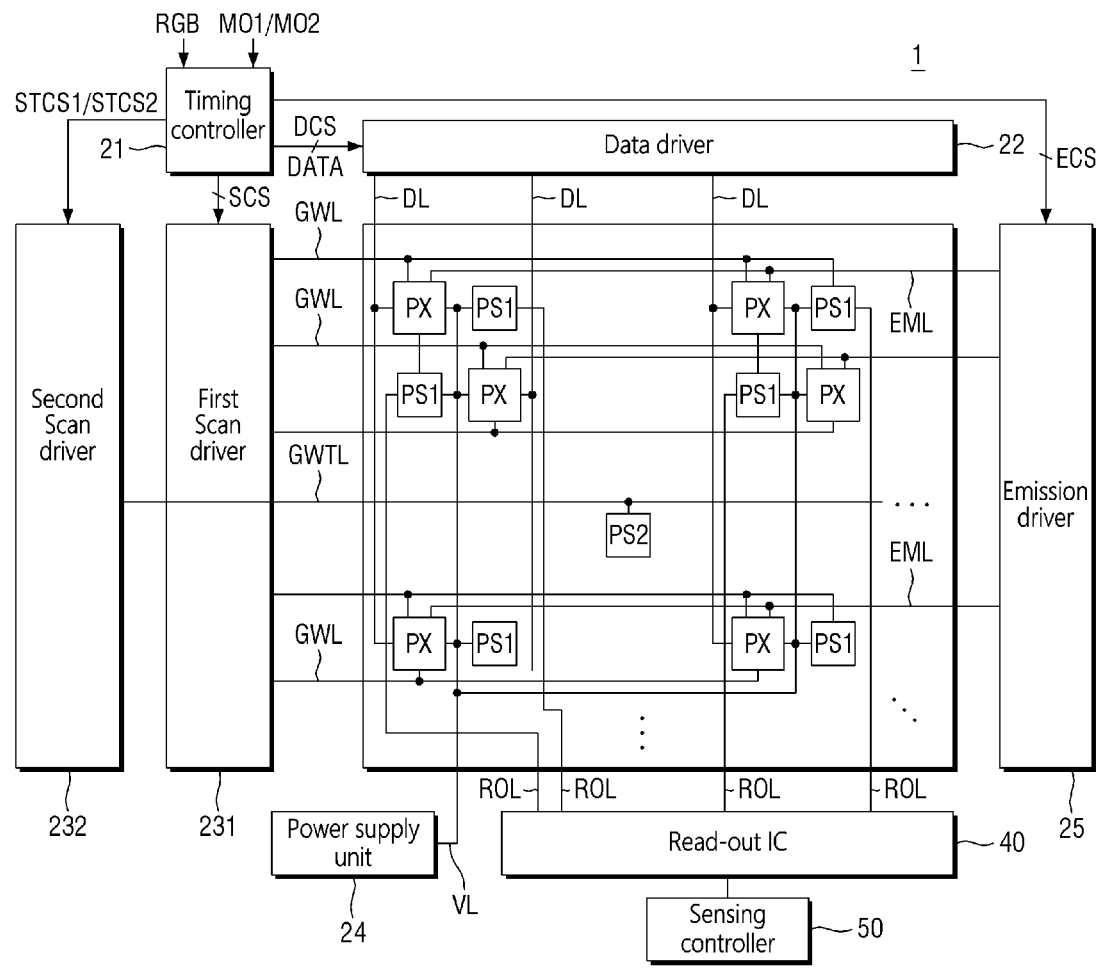
FIG. 3 is a block diagram of a display device according to an embodiment.

FIG. 3 is a block diagram of a display device according to an embodiment.

Referring to FIG. 3, the display device 1 may include the panel driving circuit 20, the read-out circuit 40, and a sensing controller 50.

The panel driving circuit 20 may include a data driver 22 that drives the pixel PX of the display panel 10, a first scan driver 231 that drives the pixel PX and a first optical sensor PS1, a second scan driver 232 that drives a second optical sensor PS2, and a timing controller 21 that controls the driving timing of the data driver 22 and a scan driver 23. In addition, the panel driving circuit 20 may further include a power supply unit 24 and an emission control driver 25.

The timing controller 21 may receive an image signal RGB and a plurality of control signals supplied from the outside of the display device 1. The image signal RGB may have a frequency of 120 Hz, for example. In another example, the image signal RGB may have a frequency of 30 Hz.

The plurality of control signals may include a first mode control signal MO1 and a second mode control signal MO2. The first mode control signal MO1 may include a signal for recognizing a fingerprint (F of FIG. 4). The second mode control signal MO2 may include a signal for sensing a position where a finger may be touched on the display panel.

The timing controller 21 may generate a scan control signal SCS. The timing controller 21 may output the scan control signal SCS to the first scan driver 231. In addition, the timing controller 21 may generate a sensing scan control signal SCTS for controlling the operation timing of the second scan driver 232.

When the first mode control signal MO1 is received, the timing controller 21 may generate a first sensing scan control signal SCTS1. The timing controller 21 may output the first sensing scan control signal SCTS1 to the second scan driver 232. In addition, when the second mode control signal MO2 is received, the timing controller 21 may generate a second sensing scan control signal SCTS2. The timing controller 21 may output the second sensing scan control signal SCTS2 to the second scan driver 232. That is, the first mode control signal MO1 may control the second optical sensor PS2 of the display panel 10 to operate in a first mode for recognizing a fingerprint. In addition, the second mode control signal MO2 may control the second optical sensor PS2 of the display panel 10 to operate in a second mode for sensing a position where a finger may be touched on the display panel.

Further, the timing controller 21 may generate image data DATA and a data control signal DCS for controlling the data driver 22. The timing controller 21 may generate an emission control driving signal ECS for controlling the operation timing of the emission control driver 25. For example, the timing controller 21 may generate the image data DATA, the data control signal DCS, and the emission control driving signal ECS, and output the image data DATA and the data control signal DCS to the data driver 22 through a data line, and output the emission control driving signal ECS to the emission control driver 25 through an emission control driving line.

The first scan driver 231 may generate scan signals in response to the scan control signal SCS from the timing controller 21. The first scan driver 231 may sequentially output the scan signals to first scan lines GWL. The second scan driver 232 may generate scan signals in response to sensing scan control signals STCS1 and STCS2. The second scan driver 232 may sequentially output the scan signals to second scan lines GWTL. Specifically, the second scan driver 232 may receive the first sensing scan control signal STCS1 and generate first sensing scan signals GWT1 (see FIG. 11). The first sensing scan signals GWT1 may be sequentially output to the second scan lines GWTL. In addition, the second scan driver 232 may receive the second sensing scan control signal STCS2 and generate second sensing scan signals GWT2. The second sensing scan signals GWT2 may be sequentially output to the second scan lines GWTL.

Figure 11:
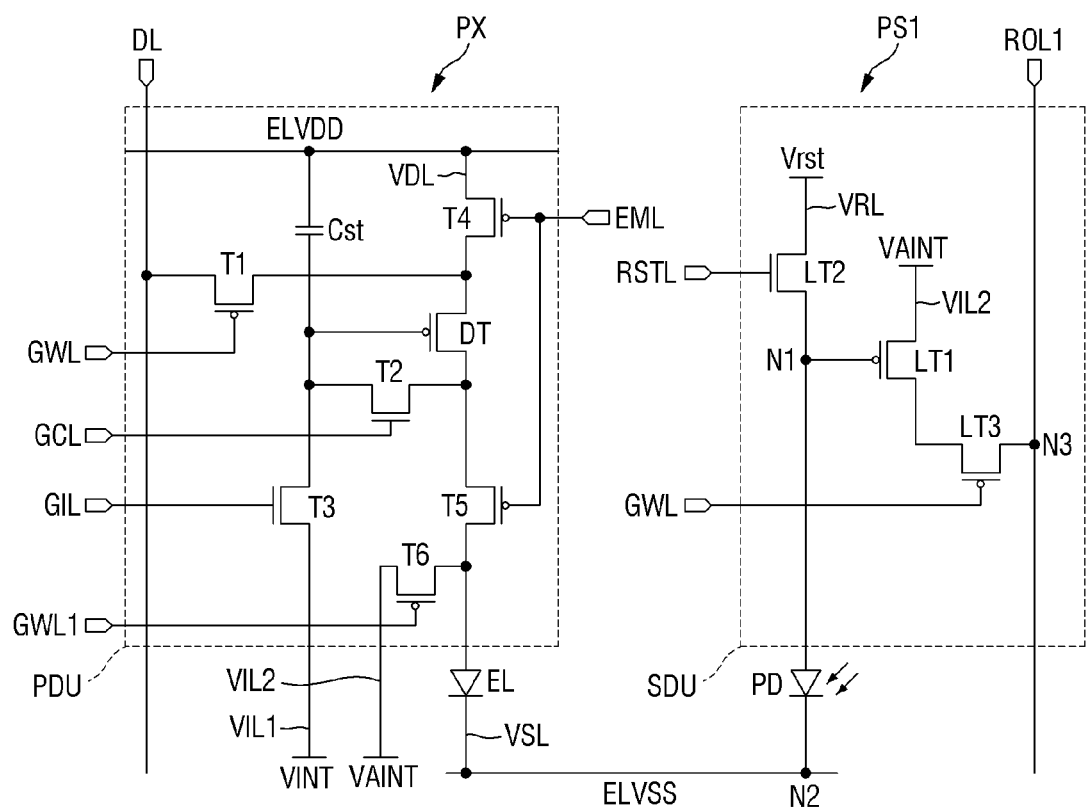
FIG. 11 is a circuit diagram illustrating a pixel and a first optical sensor according to an embodiment.

The data driver 22 may convert the image data DATA into analog data voltages and output the analog data voltages to data lines DL (see FIG. 11). Further, the power supply unit 24 may generate a driving voltage ('ELVDD' in FIG. 11) and supply it to a power voltage line VL. The power supply unit 24 may generate a common voltage ('ELVSS' in FIG. 11) and supply it to the power voltage line VL. The power voltage line VL may include a driving voltage line VDL and a common voltage line VLS (see FIG. 11). The driving voltage ELVDD may be a high potential voltage for driving the light emitting element and the photoelectric conversion element, and the common voltage may be a low potential voltage for driving the light emitting element and the photoelectric conversion element. That is, the driving voltage may have a higher potential than the common voltage.

The emission control driver 25 may generate emission control signals in response to the emission control driving signal ECS and sequentially output the emission control signals to the emission control lines EML. Although the emission control driver 25 is illustrated as being separate from the first scan driver 231 and the second scan driver 232, the present disclosure is not limited thereto and the emission control driver 25 may be included in an integrated scan driver (not shown). That is, the integrated scan driver may include the first scan driver 231, the second scan driver 232, and the emission control driver 25.

The read-out circuit 40 may be connected to each optical sensor PS through a read-out line ROL. The read-out circuit 40 may receive sensing signals (sensing currents or sensing voltages) input thereto after being generated by the respective optical sensors PS. The read-out circuit 40 may generate digital sensing data according to a magnitude of the sensing signals from the respective optical sensors PS, and may output the generated digital sensing data to the sensing controller 50.

Figure 5:
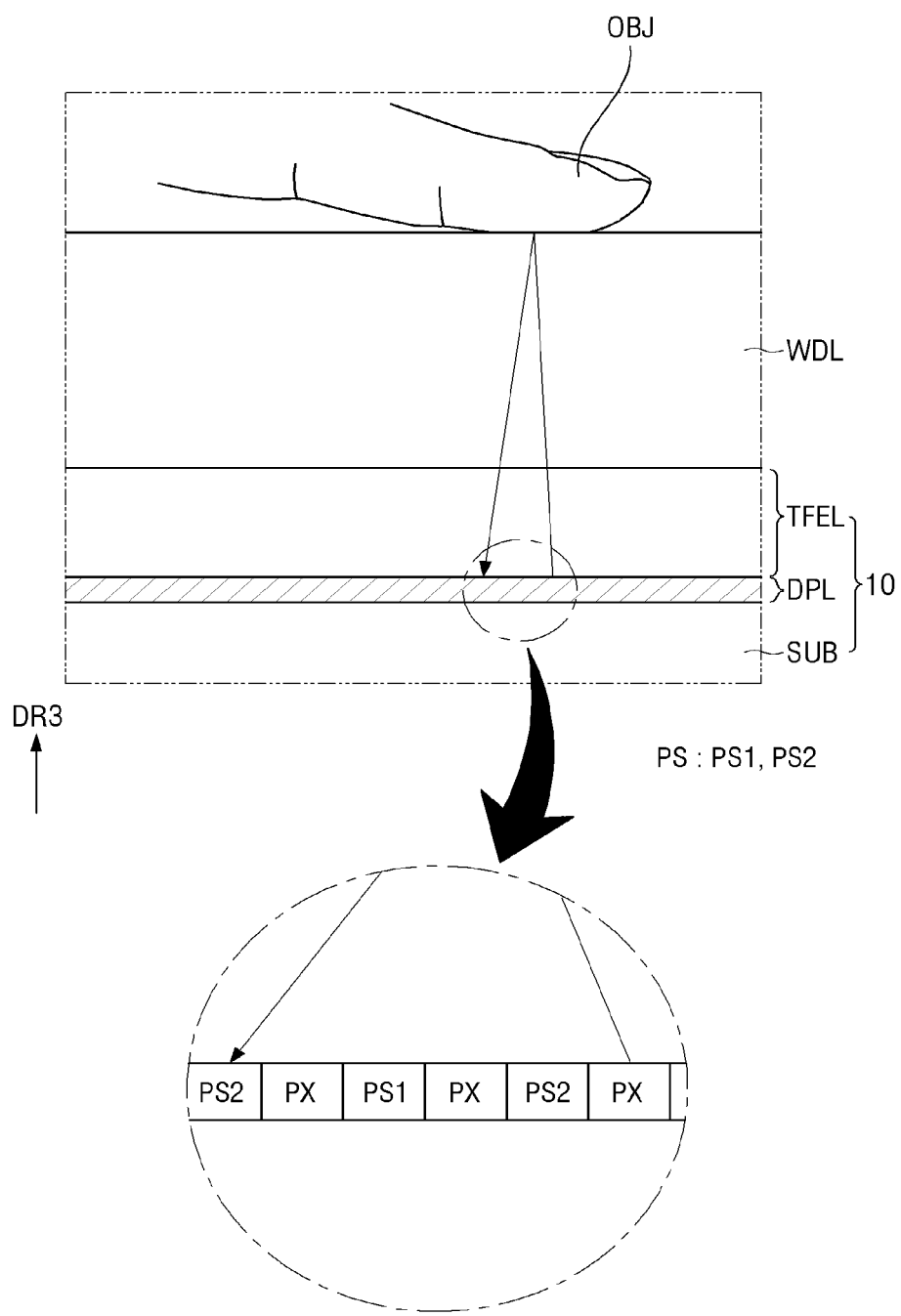
FIG. 5 is a diagram illustrating touch sensing of a display device according to an embodiment.

The sensing controller 50 may receive the sensing data from the read-out circuit 40. The sensing controller 50 may read the user's fingerprint based on the sensing data. For example, the sensing controller 50 may recognize a fingerprint (F of FIG. 4) of a finger placed on the display panel based on the sensing data. The sensing controller 50 may determine whether the recognized fingerprint coincides with stored data about the user's fingerprint through a comparison. For example, the user's fingerprint may be stored by the display device and compared to the recognized fingerprint. Referring to FIG. 5, when the user's finger OBJ touches the display panel 10, the sensing controller 50 may sense a position touched by the user's finger OBJ based on the sensing data.

Referring again to FIG. 3, the display panel 10 may further includes the plurality of pixels PX, the plurality of first optical sensors PS1, the plurality of second optical sensors PS2, the plurality of first scan lines GWL connected to the plurality of pixels PX and the plurality of first optical sensors PS1, the plurality of second scan lines GWTL connected to the plurality of second optical sensors PS2, the plurality of data lines DL and the plurality of emission control lines EML connected to the plurality of pixels PX, and the plurality of read-out lines ROL connected to the plurality of first optical sensors PS1 and the plurality of second optical sensors PS2.

Each of the plurality of pixels PX may be connected to at least one of the first scan lines GWL, any one of the data lines DL, at least one of the emission control lines EML, and the power voltage line VL.

Each of the plurality of first optical sensors PS1 may be connected to any one of the first scan lines GWL, any one of the read-out lines ROL, and the power voltage line VL.

Each of the plurality of second optical sensors PS2 may be connected to any one of the second scan lines GWTL, any one of the read-out lines ROL, and the power voltage line VL.

The plurality of first scan lines GWL may connect the first scan driver 231 to the plurality of pixels PX and the plurality of first optical sensors PS1. The plurality of first scan lines GWL may provide the scan signals output by the first scan driver 231 to the plurality of pixels PX and the plurality of first optical sensors PS1.

The plurality of second scan lines GWTL may connect the second scan driver 232 to the plurality of second optical sensors PS2. The plurality of second scan lines GWTL may provide the scan signals output from the second scan driver 232 to the plurality of second optical sensors PS2. A detailed description of the plurality of first scan lines GWL and the plurality of second scan lines GWTL is provided with reference to FIGS. 7 to 10.

The plurality of data lines DL may connect the data driver 22 and the plurality of pixels PX. The plurality of data lines DL may provide the image data output from the data driver 22 to the plurality of pixels PX.

The plurality of emission control lines EML may connect the emission control driver 25 and the plurality of pixels PX. The plurality of emission control lines EML may provide the emission control signal outputted from the emission control driver 25 to the plurality of pixels PX.

The plurality of read-out lines ROL may connect the plurality of first optical sensors PS1 and the plurality of second optical sensors PS2 to the read-out circuit 40. The plurality of read-out lines ROL may provide the sensing current generated according to the photoelectric current output by the plurality of first optical sensors PS1 and the plurality of second optical sensors PS2 to the read-out circuit 40.

The plurality of power voltage lines VL may connect the power supply unit 24 to the plurality of pixels PX, the plurality of first optical sensors PS1, and the plurality of second optical sensors PS2. The plurality of power voltage lines VL may provide the driving voltage ELVDD or the common voltage ELVSS from the power supply unit 24 to the plurality of pixels PX, the plurality of first optical sensors PS1, and the plurality of second optical sensors PS2.

FIG. 4 illustrates fingerprint sensing of a display device according to an embodiment.

Referring to FIG. 4, the display device 1 may further include a window WDL disposed on the display panel 10. The display panel 10 may include a substrate SUB, a display layer DPL disposed on the substrate SUB and including the pixels PX and the first optical sensors PS1, and an encapsulation layer TFE disposed on the display layer DPL.

When the user's finger contacts the top surface of the window WDL of the display device 1, the light output by the pixels PX of the display panel 10 may be variously reflected by a ridge RID and a valley VAL of a fingerprint F of the user, where the valley VAL may be between two ridges RID. In this case, a portion of the ridge RID of the fingerprint F may come into contact with the top surface of the window WDL, whereas a portion of the valley VAL of the fingerprint F may not contact the window WDL. That is, the top surface of the window WDL may be in contact with the air at the valley VAL portion of the fingerprint F.

In this case, since a refractive index of the fingerprint F and a refractive index of the air are different, an amount of light reflected from the ridge RID of the fingerprint F and an amount of light reflected from the valley VAL of the fingerprint F may be different. Accordingly, the ridge RID portion and the valley VAL portion of the fingerprint F may be detected based on a difference in the amount of the reflected light, that is, the light incident on the first optical sensors PS1. Since the first optical sensor PS1 outputs a sensing signal, it may be possible to recognize the pattern of the fingerprint F according to the difference in the amount of the light. incident on the first optical sensors PS1. That is, the sensing signal may be an electrical signal of a sensing current or a sensing voltage.

FIG. 5 is a diagram illustrating touch sensing of a display device according to an embodiment.

Referring to FIG. 5, the display layer may further include the second optical sensor PS2.

When the user's finger OBJ contacts the top surface of the window WDL of the display device 1, the light output by the pixels PX of the display panel 10 may be reflected by the user's finger OBJ. In this case, the second optical sensor PS2 may receive the light reflected by the user's finger OBJ. Accordingly, the user's touch position may be sensed according to a sensing signal output according to the reflected light, that is, the light incident on the second optical sensor PS2.

In embodiments illustrated by FIGS. 4 and 5, since the touch sensing and the fingerprint recognition are integrated in the display device 1, the user's touch position may be sensed and the recognized fingerprint of the user can be authenticated without needing to use a separate touch panel and a separate fingerprint sensor.

Figure 6:
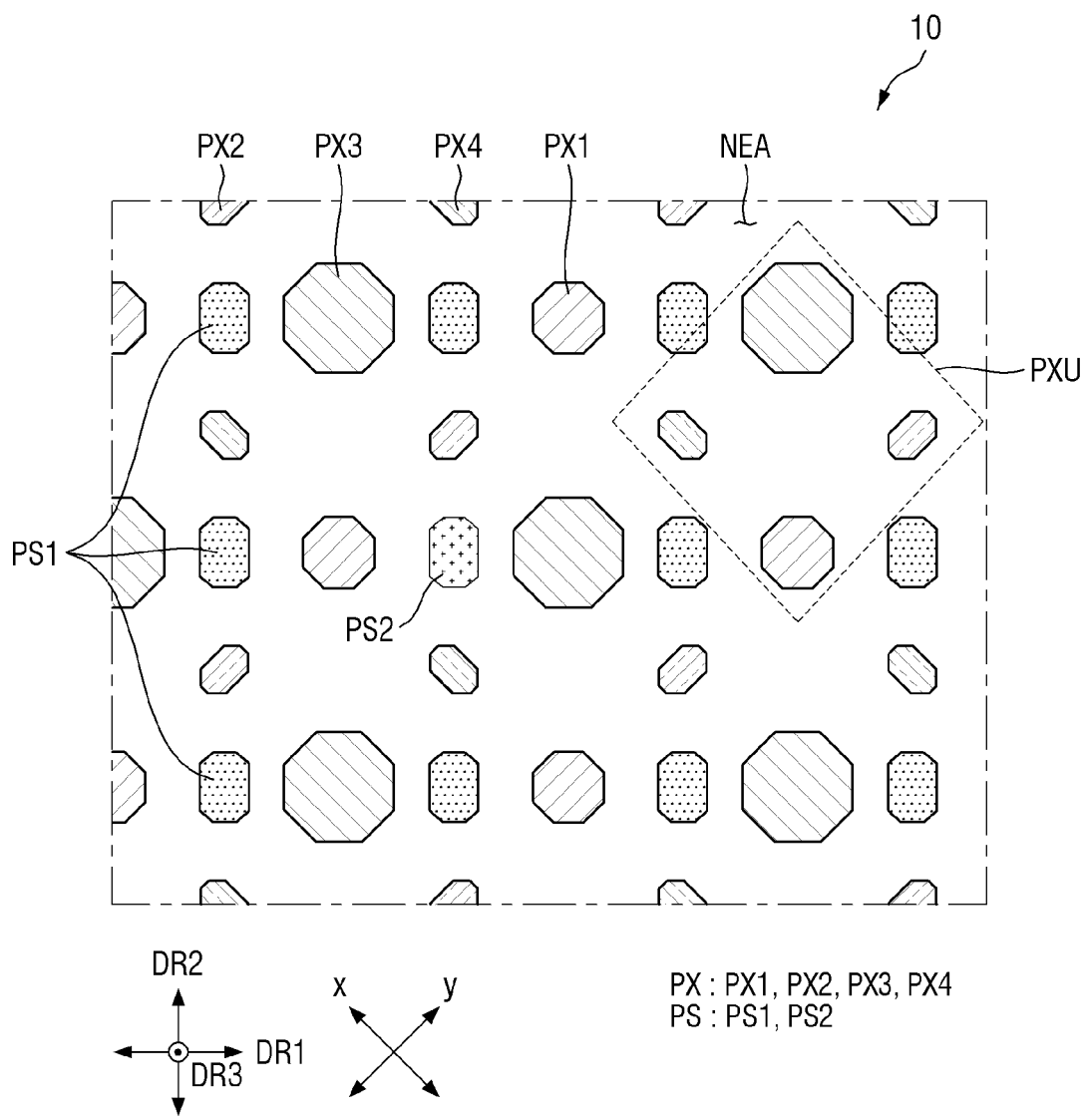
FIG. 6 is a plan view illustrating a pixel and an optical sensor according to an embodiment.

FIG. 6 is a plan view illustrating a pixel and an optical sensor according to an embodiment.

Referring to FIG. 6, the display panel 10 may include the plurality of pixels PX and the plurality of optical sensors PS. The plurality of pixels PX and the plurality of optical sensors PS may be disposed in a repeating pattern.

The plurality of pixels PX may include a first sub-pixel PX1, a second sub-pixel PX2, a third sub-pixel PX3, and a fourth sub-pixel PX4. For example, the first sub-pixel PX1 may emit light of a red wavelength, the second sub-pixel PX2 and the fourth sub-pixel PX4 may emit light of a green wavelength, and the third sub-pixel PX3 may emit light of a blue wavelength. The plurality of pixels PX may include a number of emission areas that emit light. The plurality of optical sensors PS may include a multiple light sensing areas that sense incident light.

The first sub-pixel PX1, the second sub-pixel PX2, the third sub-pixel PX3, the fourth sub-pixel PX4, and the plurality of optical sensors PS may be arranged in the first direction DR1 and the second direction DR2 intersecting the first direction DR1. In an embodiment, the first sub-pixel PX1 and the third sub-pixel PX3 may be alternately arranged along the first direction DR1 in a first row, and the second sub-pixel PX2 and the fourth sub-pixel PX4 may be alternately arranged along the first direction DR1 in a second row adjacent to the first row. The pixels PX belonging to the first row and the pixels PX belonging to the second row may be disposed in a zigzag pattern in the first direction DR1. That is, an arrangement of the second sub-pixel PX2 in the second row, the third sub-pixel PX3 in the first row, the fourth sub-pixel PX4 in the second row, and the first sub-pixel PX1 in the first row forms a zigzag pattern along the first direction DR1. The arrangement of the first row and the second row may be repeated up to an $n^{th}$ row.

In other words, the first sub-pixel PX1 and the fourth sub-pixel PX4 may be arranged in a first diagonal direction X intersecting the first direction DR1 and the second direction DR2, and the second sub-pixel PX2 and the third sub-pixel PX3 may be arranged in the first diagonal direction X. The second sub-pixel PX2 and the third sub-pixel PX3 may be arranged in a second diagonal direction Y intersecting the first diagonal direction X, and the first sub-pixel PX1 and the fourth sub-pixel PX4 may be arranged in the second diagonal direction Y. The first diagonal direction X may be a direction obliquely inclined between the first direction DR1 and the second direction DR2, and the second diagonal direction Y may be a direction orthogonal to the first diagonal direction X. For example, the first diagonal direction X may be a direction inclined by 45° with respect to the first direction DR1 and the second direction DR2, but is not limited thereto.

An optical sensor PS (e.g., a first optical sensor PS1 and a second optical sensor PS2) may be disposed between the first sub-pixel PX1 and the third sub-pixel PX3 forming the first row, while being spaced apart therefrom. The first sub-pixel PX1, the optical sensor PS, and the third sub-pixel PX3 may be alternately arranged in the first direction DR1. Each optical sensor PS may be disposed between an instance of the second sub-pixel PX2 and an instance of the fourth sub-pixel PX4 forming the second row, while being spaced apart therefrom. The second sub-pixel PX2, the optical sensor PS, and the fourth sub-pixel PX4 may be alternately arranged in the first direction DR1. The number of the optical sensors PS included in the first row may be equal to the number of the optical sensors PS included in the second row. The arrangement of the first row and the second row may be repeated up to the $n^{th}$ row. As described herein, in one touch sensing unit (TSA1 of FIG. 7), the number of first optical sensors PS1 may be greater than the number of second optical sensors PS2. A description thereof is given with reference to FIGS. 8 to 10.

The size of the emission area of fingerprint display pixels PX may be different. For example, the size of the emission area of the second sub-pixel PX2 and the fourth sub-pixel PX4 may be smaller than the size of the emission area of the first sub-pixel PX1 or the third sub-pixel PX3. Although each of the pixels PX is illustrated as having an octagonal shape, the shape of the pixels PX is not limited thereto, and each pixel PX may have a rectangular, square, circular, or other polygonal shape. Moreover, different ones of the pixels PX may have different shapes.

One display pixel unit PXU may include one first sub-pixel PX1, one second sub-pixel PX2, one third sub-pixel PX3, and one fourth sub-pixel PX4. The display pixel unit PXU may refer to a group of color pixels capable of expressing various light, including grayscale light.

Figure 7:
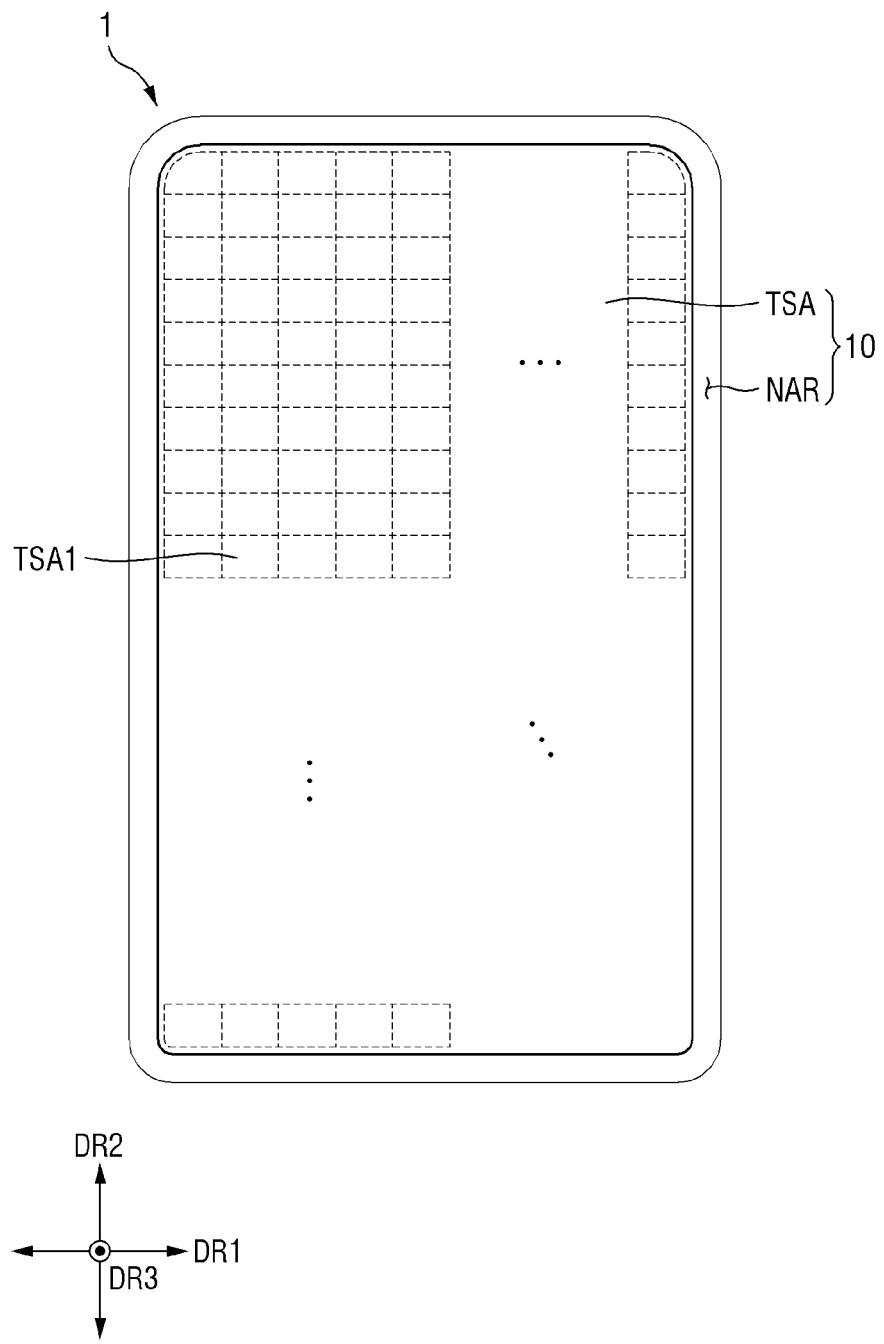
FIG. 7 is a plan view illustrating a touch sensing area according to an embodiment.
Figure 8:
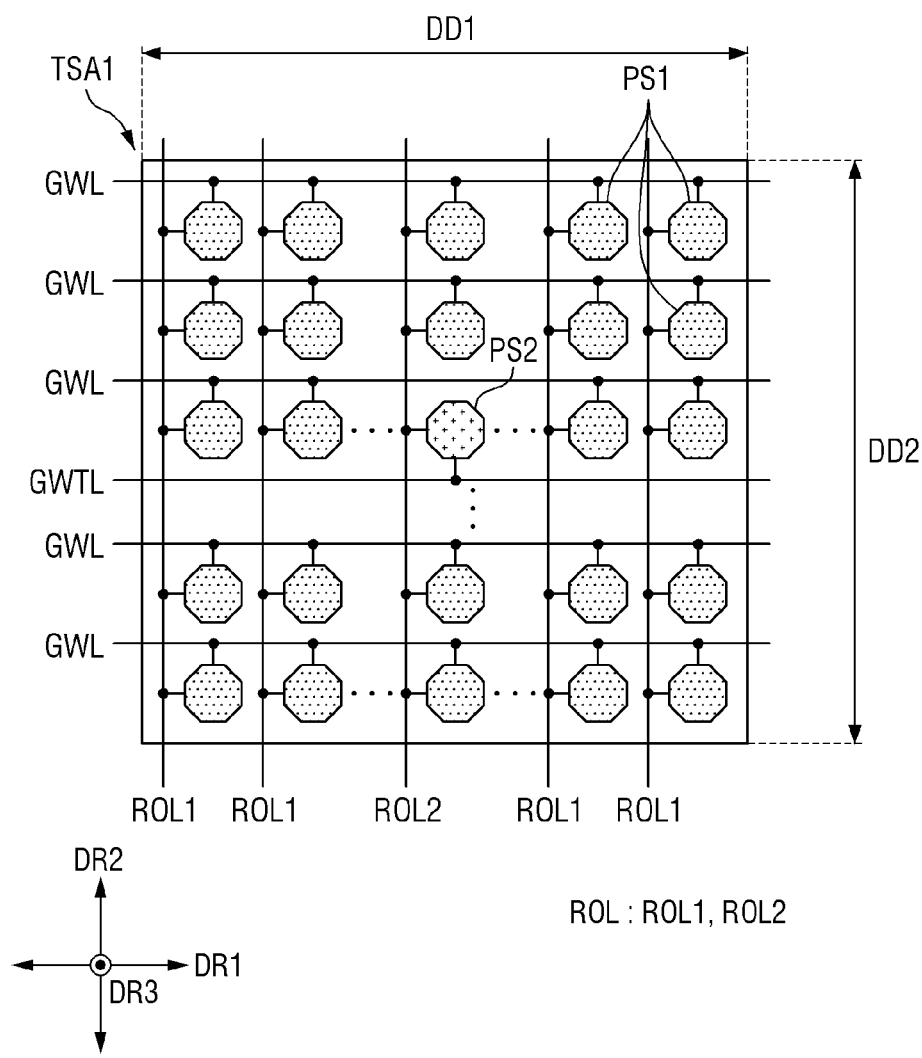
FIG. 8 is a plan view illustrating a first optical sensor and a second optical sensor according to an embodiment.
Figure 9:
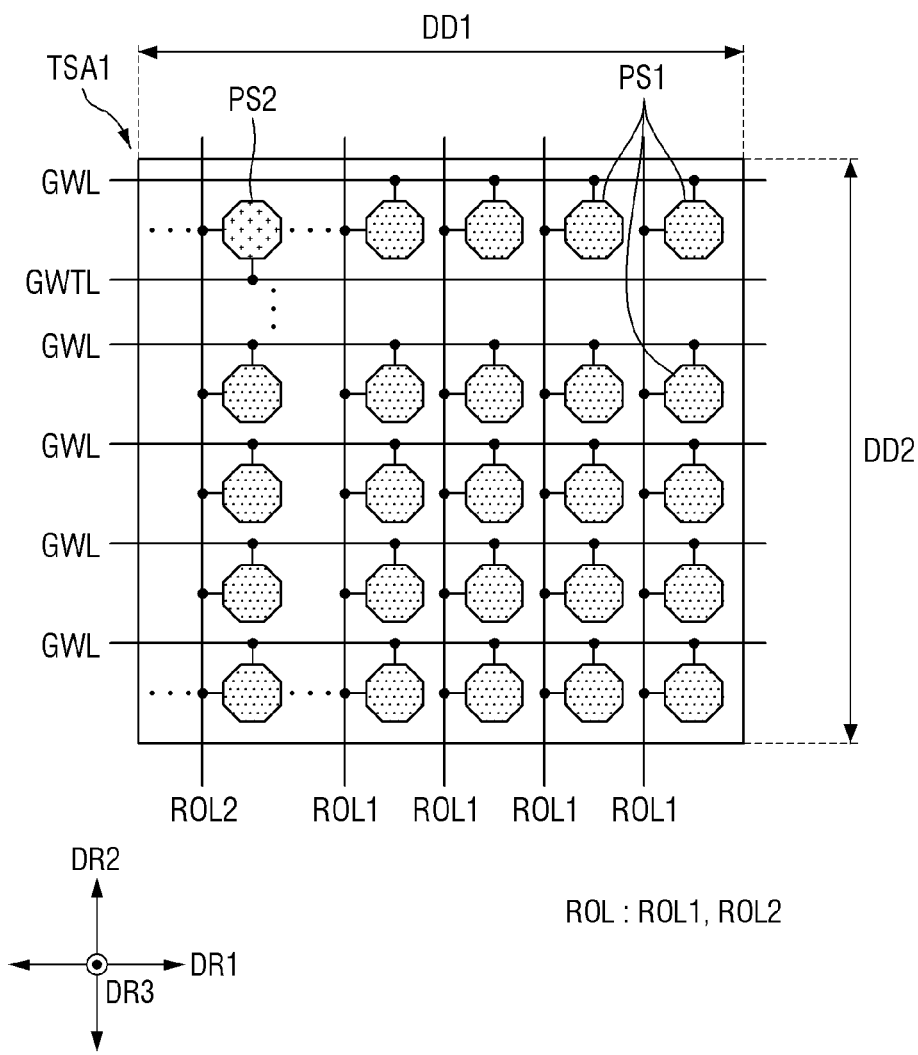
FIG. 9 is a plan view illustrating a first optical sensor and a second optical sensor according to another embodiment.
Figure 10:
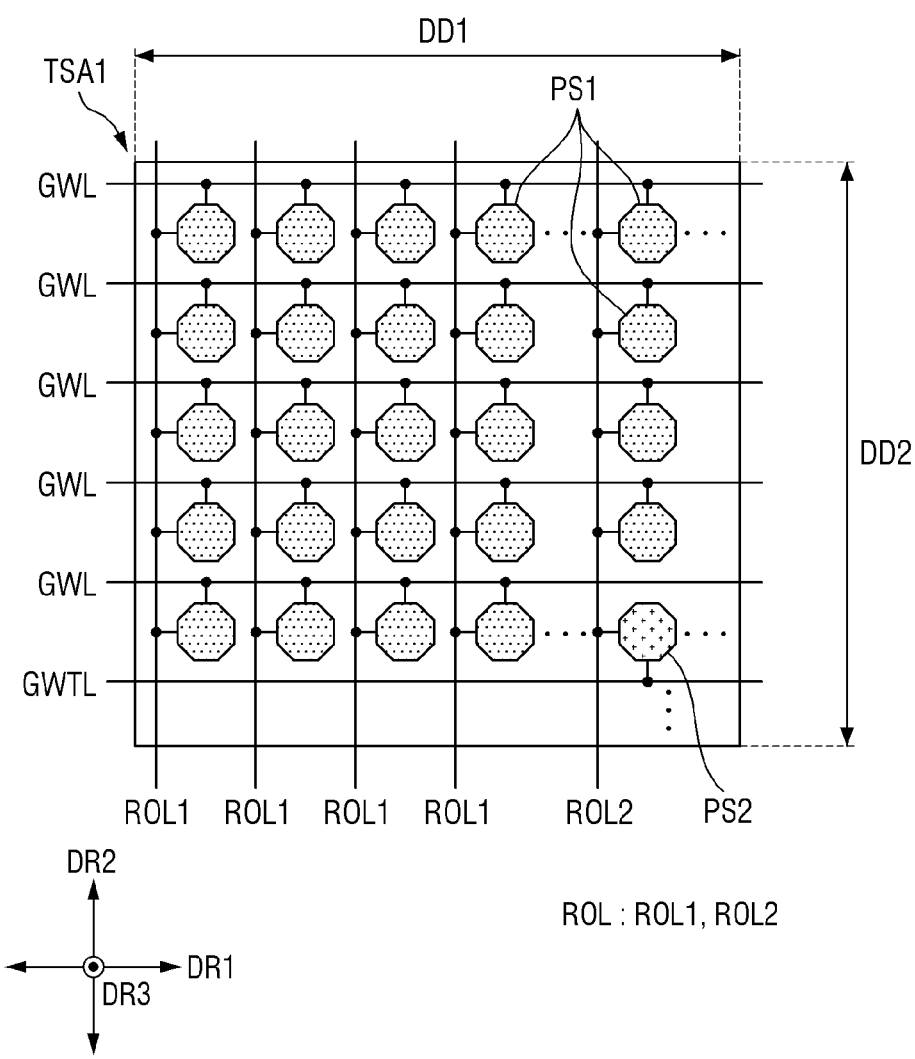
FIG. 10 is a plan view illustrating a first optical sensor and a second optical sensor according to still another embodiment.

FIG. 7 is a plan view illustrating a touch sensing area according to an embodiment. FIG. 8 is a plan view illustrating a first optical sensor and a second optical sensor according to an embodiment. FIG. 9 is a plan view illustrating a first optical sensor and a second optical sensor according to another embodiment. FIG. 10 is a plan view illustrating a first optical sensor and a second optical sensor according to still another embodiment.

Referring to FIGS. 7 and 8, the active region of the display panel includes a touch sensing area TSA for sensing the user's touch. That is, the touch sensing area TSA may overlap the active region of the display panel.

The touch sensing area TSA may include a plurality of touch sensing units TSA1. A single touch sensing unit TSA1 may be defined as a minimum unit area capable of recognizing the user's touch position. The touch sensing unit TSA1 may have a rectangular shape, for example, a square shape. For example, a length DD1 of the touch sensing unit TSA1 in the first direction DR1 may be between about 1 millimeter (mm) to about 4 mm. In addition, a length DD2 of the touch sensing unit TSA1 in the second direction DR2 may be between about 1 mm to about 4 mm. However, the present disclosure is not limited thereto, and the touch sensing unit TSA1 may have a shape such as a rectangle or a rhombus.

The touch sensing unit TSA1 may include at least one second optical sensor PS2. In the touch sensing unit TSA1, the second optical sensor PS2 may generate a sensing signal according to external light and output the generated sensing signal through a read-out line. Thus, the sensing controller 50 can recognize the user's touch. In addition, the touch sensing unit TSA1 may include a plurality of pixels and the plurality of first optical sensors PS1.

Referring to FIG. 8, the touch sensing unit TSA1 may include the plurality of first optical sensors PS1, the second optical sensor PS2, the first scan lines GWL, the second scan lines GWTL, and read-out lines ROL, including the first read-out line ROL1 and the second read-out line ROL2.

The first optical sensors PS1 may be arranged in a matrix in the first direction DR1 and the second direction DR2. Although not shown in FIG. 8, the first optical sensors PS1 and the plurality of pixels may be alternately arranged. The first optical sensors PS1 may serve to generate a first sensing signal according to external light so that a fingerprint can be recognized by the sensing controller 50.

The second optical sensor PS2 may be disposed at a center of the touch sensing unit TSA1, or may be disposed adjacent to a side of the touch sensing unit TSA1. For example, as shown in FIG. 8, the second optical sensor PS2 may be disposed at the center of the touch sensing unit TSA1 on a plane formed by the first direction DR1 and the second direction DR2. Alternatively, as shown in FIG. 9, the second optical sensor PS2 may be disposed adjacent to the upper left edge of the touch sensing unit TSA1. Still alternatively, as shown in FIG. 10, the second optical sensor PS2 may be disposed adjacent to the lower right edge of the touch sensing unit TSA1.

The number of the second optical sensors PS2 may be less than the number of the plurality of first optical sensors PS1. Also, although not shown in the drawings, the number of the second optical sensors PS2 may be less than the number of the plurality of pixels. Accordingly, the second optical sensor PS2 of the touch sensing unit TSA1 may be surrounded by multiple first optical sensors PS1. In a first mode, the second optical sensors PS2 may serve to generate a second sensing signal according to the external light so that the fingerprint can be recognized by the sensing controller 50. In a second mode, the second optical sensors PS2 may serve to generate a second sensing signal according to the external light so that the user's touch can be sensed by the sensing controller 50.

Each first scan line GWL may extend in the first direction DR1. The first scan lines GWL may be arranged side-by-side in the second direction DR2. The plurality of first optical sensors PS1 and the second optical sensor PS2 may be disposed between the first scan lines GWL. The first scan lines GWL are respectively connected to the first optical sensors PS1. Although not shown in the drawings, the first scan lines GWL may also be respectively connected to the plurality of pixels. The first optical sensors PS1 may be connected to the first scan lines GWL to receive first scan signals GW (see FIG. 13).

The second scan line GWTL may extend in the first direction DR1. The second scan line GWTL may be arranged in parallel with the first scan lines GWL. The second scan lines GWTL may be disposed adjacent to the second optical sensor PS2. For example, as illustrated in FIG. 8, if the second optical sensor PS2 is disposed at the center of the touch sensing unit TSA1, the second scan line GWTL may be disposed at the center of the touch sensing unit TSA1 in the first direction DR1. As depicted in FIG. 9, if the second optical sensor PS2 is disposed adjacent to the upper left side of the touch sensing unit TSA1 in the first direction DR1, the second scan line GWTL may be disposed on the upper left side of the touch sensing unit TSA1 in the first direction DR1. As shown in FIG. 10, if the second optical sensor PS2 is disposed adjacent to the lower right side of the touch sensing unit TSA1, the second scan line GWTL may be disposed on the lower right side of the touch sensing unit TSA1 in the first direction DR1.

The second scan line GWTL may be connected to the second optical sensor PS2. The second optical sensor PS2 may be connected to the second scan line GWTL to receive the first sensing scan signals GWT1 or the second sensing scan signals GWT2 (see FIG. 14). For example, in the first mode for recognizing a fingerprint, the first sensing scan signal GWT1 may be applied to the second scan line GWTL. In the second mode for sensing a touch, the second sensing scan signal GWT2 may be applied to the second scan line GWTL.

First read-out lines ROL1 may extend in the second direction DR2. The first read-out lines ROL1 may be arranged side-by-side in the first direction DR1. The plurality of first optical sensors PS1 and the second optical sensor PS2 may be disposed between the first read-out lines ROL1. The first read-out lines ROL1 may be respectively connected to the first optical sensors PS1. The first optical sensors PS1 may be connected to the first read-out lines ROL1 to output the first sensing signals.

A second read-out line ROL2 may be disposed in the second direction DR2. The second read-out line ROL2 may be arranged in parallel with the first read-out lines ROLL. For example, as shown in FIG. 8, if the second optical sensor PS2 is disposed at the center of the touch sensing unit TSA1, the second read-out line ROL2 may be disposed at the center of the touch sensing unit TSA1 in the second direction DR2. As shown in FIG. 9, if the second optical sensor PS2 is disposed adjacent to the upper left side of the touch sensing unit TSA1, the second read-out line ROL2 may be disposed on the upper left side of the touch sensing unit TSA1 in the second direction DR2. As illustrated in FIG. 10, if the second optical sensor PS2 is disposed adjacent to the lower right side of the touch sensing unit TSA1, the second read-out line ROL2 may be disposed on the lower right side of the touch sensing unit TSA1 in the second direction DR2.

The second read-out line ROL2 may be disposed adjacent to the second optical sensor PS2. The second read-out line ROL2 may be connected to the second optical sensor PS2. The second optical sensor PS2 may be connected to the second read-out line ROL2 to output the second sensing signals.

Accordingly, as the first sensing scan signal GWT1 or the second sensing scan signal GWT2 is applied to the second scan line GWTL in the single touch sensing unit TSA1, the second optical sensor PS2 may recognize the fingerprint and sense the touch. That is, the touch sensing and the fingerprint recognition may be integrated through the first optical sensors PS1 and the second optical sensor PS2. Thus, the user's touch position can be sensed and the recognized fingerprint of the user can be authenticated without using a separate touch panel and a separate fingerprint sensor.

FIG. 11 is a circuit diagram illustrating a pixel and a first optical sensor according to an embodiment.

FIG. 11 presents an example circuit diagram illustrating the pixel PX and the first optical sensor PS1. The pixel PX may be connected to a scan initialization line GIL, the first scan line GWL, a scan control line GCL, a first scan line GWL1, and the data line DL. The first optical sensor PS1 may be connected to the first scan line GWL, a reset control line RSTL, and the first read-out line ROLL Referring to FIG. 11, the pixel PX may include a light emitting element EL and a pixel driver PDU that may control an amount of light emission of the light emitting element EL. The light emitting element EL may include an emission portion that emits light. The pixel driver PDU may include a driving transistor DT, a plurality of switch elements, and a first capacitor Cst. The switch elements may include a first transistor T1, a second transistor T2, a third transistor T3, a fourth transistor T4, a fifth transistor T5, and a sixth transistor T6.

The driving transistor DT may include a gate electrode, a first electrode, and a second electrode. The driving transistor DT may control a drain-source current Isd (hereinafter, referred to as "driving current") flowing between the first electrode and the second electrode according to a data voltage applied to the gate electrode. The driving current Isd flowing through a channel of the driving transistor DT may be proportional to the square of the difference between a threshold voltage and a voltage Vgs between the first electrode and the gate electrode of the driving transistor DT, as shown in Eq. (1).

$$Isd = k' \times (Vsg - Vth)^2 \tag{1}$$

In Eq. (1), Isd is a source-drain current flowing through the channel of the driving transistor DT as a driving current, k' is a proportional coefficient determined by the structure and physical characteristics of the driving transistor, Vsg is a voltage between the first electrode and the gate electrode of the driving transistor, and Vth is the threshold voltage of the driving transistor.

The light emitting element EL may emit light according to the driving current Isd. As the driving current Isd increases, the amount of light emitted from the light emitting element EL may increase.

The light emitting element EL may be an organic light emitting diode including an organic light emitting layer disposed between an anode electrode and a cathode electrode. An anode electrode of the light emitting element EL may correspond to pixel electrodes and a cathode electrode of the light emitting element EK may correspond to a common electrode. The anode electrode of the light emitting element EL may be connected to the second electrode of the fifth transistor T5 and the first electrode of the sixth transistor T6, and the cathode electrode may be connected to the common voltage line VSL to which the common voltage ELVSS may be applied. Alternatively, the light emitting element EL may be a quantum dot light emitting element including a quantum dot light emitting layer disposed between an anode electrode and a cathode electrode. Alternatively, the light emitting element EL may be an inorganic light emitting element including an inorganic semiconductor disposed between an anode electrode and a cathode electrode. When the light emitting element EL is an inorganic light emitting element, a micro light emitting diode or a nano light emitting diode may be included. Other embodiments of the light emitting element EL are possible and the present disclosure is not limited to examples described herein.

The first transistor T1 may be turned on by the first scan signal GW of the first scan line GWL to connect the first electrode of the driving transistor DT to the data line DL. Accordingly, the data voltage of the data line DL may be applied to the first electrode of the driving transistor DT. The gate electrode of the first transistor T1 may be connected to the first scan line GWL, the first electrode thereof may be connected to the data line DL, and the second electrode thereof may be connected to the first electrode of the driving transistor DT.

The second transistor T2 may be turned on by the scan control signal of the scan control line GCL to connect the gate electrode of the driving transistor DT to the second electrode of the driving transistor DT. When the gate electrode of the driving transistor DT is connected to the second electrode thereof, the driving transistor DT may be driven as a diode. The gate electrode of the second transistor T2 may be connected to the scan control line GCL, the first electrode may be connected to the gate electrode of the driving transistor DT, and the second electrode may be connected to the second electrode of the driving transistor DT.

The third transistor T3 may be turned on by the scan initialization signal of the scan initialization line GIL to connect the gate electrode of the driving transistor DT to the first initialization voltage line VIL1. Accordingly, the first initialization voltage VINT of the first initialization voltage line VIL1 may be applied to the gate electrode of the driving transistor DT. The gate electrode of the third transistor T3 may be connected to the scan initialization line GIL, the first electrode thereof may be connected to the first initialization voltage line VIL1, and the second electrode thereof may be connected to the gate electrode of the driving transistor DT.

The fourth transistor T4 may be turned on by the emission control signal of the emission control line EML to connect the first electrode of the driving transistor DT to the driving voltage line VDL to which the driving voltage ELVDD is applied. The gate electrode of the fourth transistor T4 may be connected to the emission control line EML, the first electrode thereof may be connected to the driving voltage line VDL, and the second electrode thereof may be connected to the first electrode of the driving transistor DT.

The fifth transistor T5 may be turned on by the emission control signal of the emission control line EML to connect the second electrode of the driving transistor DT to the anode electrode of the light emitting element EL. The gate electrode of the fifth transistor T5 may be connected to the emission control line EML, the first electrode thereof may be connected to the second electrode of the driving transistor DT, and the second electrode thereof may be connected to the anode electrode of the light emitting element EL.

When both the fourth transistor T4 and the fifth transistor T5 are turned on, the driving current Isd of the driving transistor DT according to the voltage of the gate electrode of the driving transistor DT may flow through the light emitting element EL.

The sixth transistor T6 may be turned on by the scan signal of the first scan line GWL1 to connect the anode electrode of the light emitting element EL to a second initialization voltage line VIL2. A second initialization voltage VAINT of the second initialization voltage line VIL2 may be applied to the anode electrode of the light emitting element EL. The gate electrode of the sixth transistor T6 may be connected to the first scan line GWL1, the first electrode thereof may be connected to the anode electrode of the light emitting element EL, and the second electrode thereof may be connected to the second initialization voltage line VIL2.

The first capacitor Cst may be formed between the gate electrode of the driving transistor DT and the driving voltage line VDL. The first capacitor electrode of the first capacitor Cst may be connected to the gate electrode of the driving transistor DT, and the second capacitor electrode thereof may be connected to the driving voltage line VDL.

When the first electrode of each of the driving transistor DT and the first to sixth transistors T1, T2, T3, T4, T5, and T6 is a source electrode, the second electrode thereof may be a drain electrode. Alternatively, when the first electrode of each of the driving transistor DT and the first to sixth transistors T1, T2, T3, T4, T5, and T6 is a drain electrode, the second electrode thereof may be a source electrode.

The active layer of each of the driving transistor DT and the first to sixth transistors T1, T2, T3, T4, T5, and T6 may also be formed of any one of polysilicon, amorphous silicon, and oxide semiconductor. For example, the active layer of each of the driving transistor DT, the first transistor T1, and the fourth to sixth transistors T4 to T6 may be made of polysilicon. The active layer of each of the second transistor T2 and the third transistor T3 may be formed of an oxide semiconductor. In this case, the driving transistor DT, the first transistor T1, and the fourth to sixth transistors T4 to T6 may be formed of a P-type MOSFET, and the second transistor T2 and the third transistor T3 may also be formed of an N-type MOSFET.

Each of the plurality of first optical sensors PS1 may include a photoelectric conversion element PD and a fingerprint sensing driver SDU that controls a sensing current according to the photoelectric current of the conversion element PD. The photoelectric conversion element PD includes photo-sensing portions that sense external light.

The sensing driver SDU may include a plurality of sensing transistors and various signal lines for controlling the sensing current generated by the photoelectric conversion element PD. The plurality of sensing transistors may include a first sensing transistor LT1, a second sensing transistor LT2, and a third sensing transistor LT3.

Figure 15:
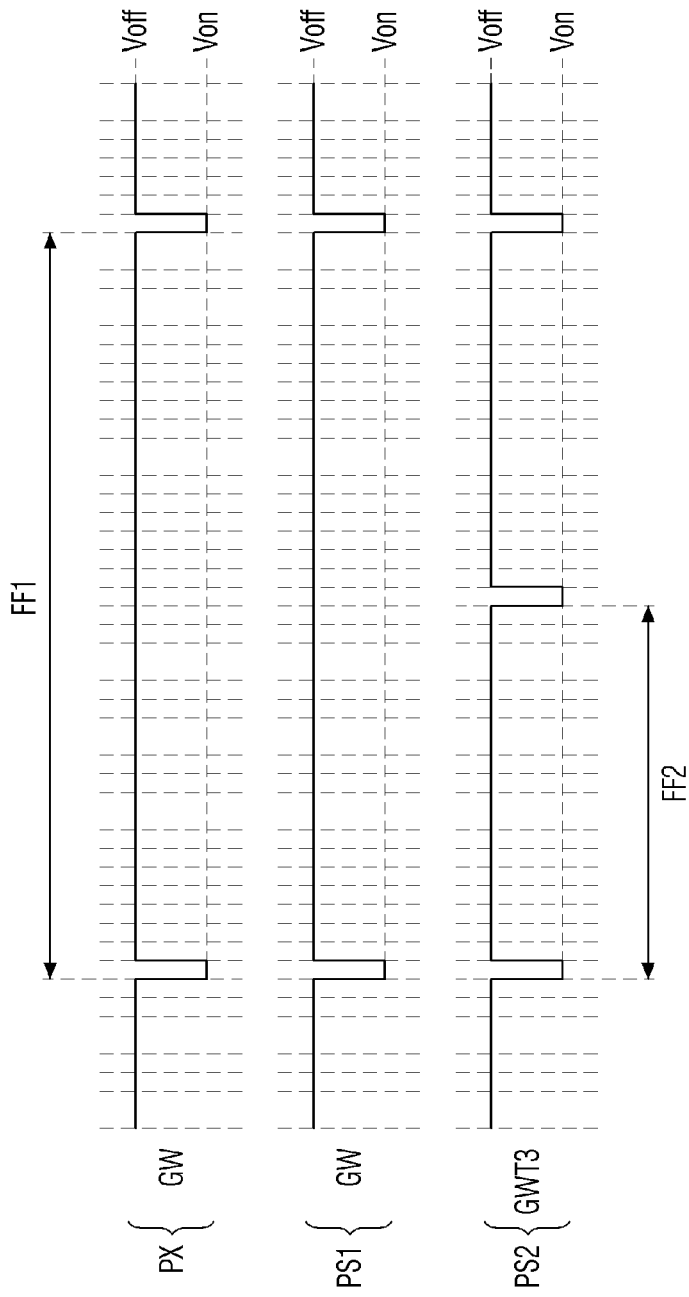
FIG. 15 is a timing diagram illustrating a first scan signal and a second scan signal according to another embodiment.

Each of the photoelectric conversion elements PD may be a photodiode including a sensing anode electrode, a sensing cathode electrode, and a photoelectric conversion layer disposed between the sensing anode electrode and the sensing cathode electrode. Each of the photoelectric conversion elements PD may convert externally incident light into an electrical signal. The photoelectric conversion element PD may be an inorganic photodiode or a phototransistor formed of a pn-type or pin-type inorganic material. Alternatively, the photoelectric conversion element PD may also be an organic photodiode including an electron donating material generating donor ions and an electron accepting material generating acceptor ions. In FIG. 15, the sensing anode electrode of the photoelectric conversion element PD may correspond to a sensing electrode 180, and the sensing cathode electrode may correspond to the common electrode 190.

When the photoelectric conversion element PD is exposed to external light, photocharges may be generated, and the generated photocharges may be accumulated in the sensing anode electrode of the photoelectric conversion element PD. In this case, the voltage of a first node N1 electrically connected to the sensing anode electrode may increase. When the photoelectric conversion element PD and the first read-out line ROLL are connected according to the first and third sensing transistors LT1 and LT3 being turned on, a sensing voltage may be accumulated at the third node N3 between the first read-out line ROLL and the third sensing transistor LT3 in proportion to the voltage of the first node N1 in which the electric charges are accumulated.

The first sensing transistor LT1 may be turned on by the voltage of the first node N1 applied to the gate electrode to connect the second initialization voltage line VIL2 to the second electrode of the third sensing transistor LT3. The gate electrode of the first sensing transistor LT1 may be connected to the first node N1, the first electrode thereof may be connected to the second initialization voltage line VIL2, and the second electrode thereof may be connected to the first electrode of the third sensing transistor LT3. The first sensing transistor LT1 may be a source follower amplifier that generates a source-drain current in proportion to the electric charge of the first node N1 input to the gate electrode thereof. Although the first electrode of the first sensing transistor LT1 is illustrated as being connected to the first initialization voltage line VIL1, the present disclosure is not limited thereto, and the first electrode of the first sensing transistor LT1 may be connected to the driving voltage line VDL or the first initialization voltage line VIL1.

The second sensing transistor LT2 may be turned on by the reset control signal of the reset control line RSTL to connect the first node N1 to the reset voltage line VRL applying the reset voltage Vrst. The gate electrode of the second sensing transistor LT2 may be connected to the reset control line RSTL, the first electrode thereof may be connected to the reset voltage line VRL, and the second electrode thereof may be connected to the first node N1.

The third sensing transistor LT3 may be turned on by the first scan signal GW of the first scan line GWL to connect the second electrode of the first sensing transistor LT1 and the first read-out line ROLL. The gate electrode of the third sensing transistor LT3 may be connected to the first scan line GWL, the first electrode thereof may be connected to the second electrode of the first sensing transistor LT1, and the second electrode thereof may be connected to the third node N3 and the first read-out line ROLL An active layer of each of the first to third sensing transistors LT1, LT2, and LT3 may also be formed of any one of polysilicon, amorphous silicon, and an oxide semiconductor. For example, the active layer of the first sensing transistor LT1 and the third sensing transistor LT3 may be made of polysilicon. The active layer of the second sensing transistor LT2 may be formed of an oxide semiconductor. In this case, the first sensing transistor LT1 and the third sensing transistor LT3 may be formed of a P-type MOSFET, and the second sensing transistor LT2 may also be formed of an N-type MOSFET.

Figure 12:
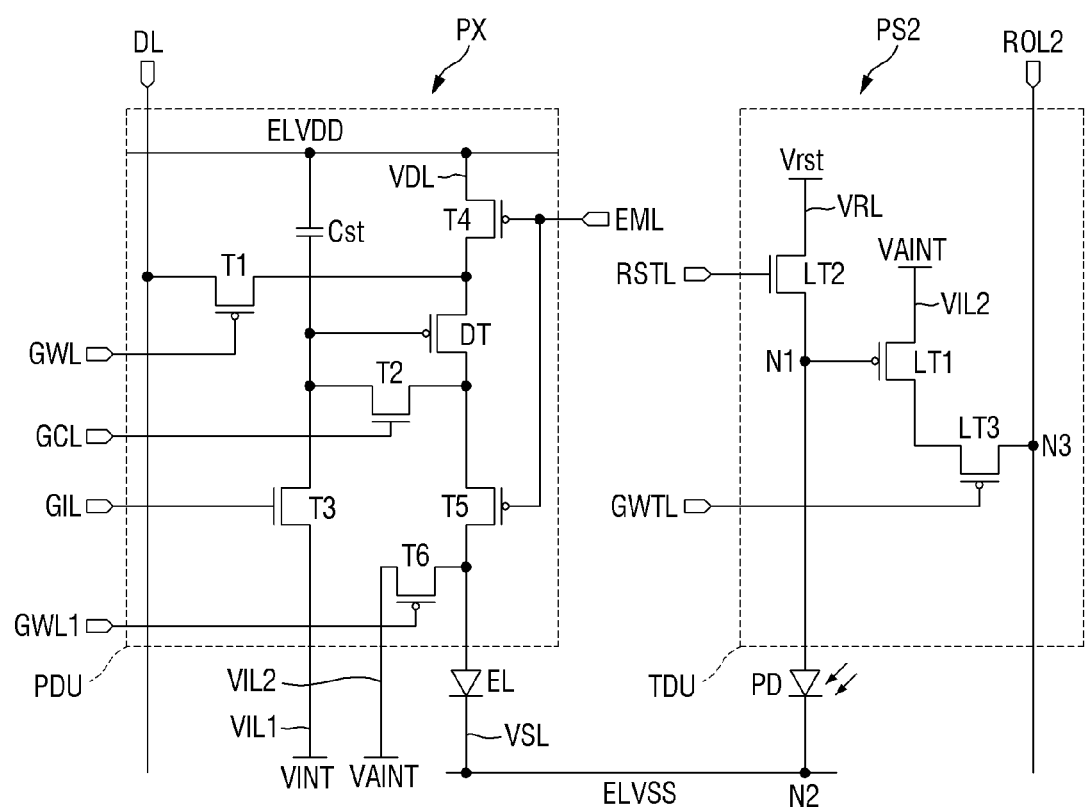
FIG. 12 is a circuit diagram illustrating a pixel and a second optical sensor according to still another embodiment.

FIG. 12 is a circuit diagram illustrating a pixel and a second optical sensor according to still another embodiment.

Since FIG. 12 is substantially the same as FIG. 11, except for the second scan line GWTL connected to a gate electrode of a third transistor LT3 of a touch sensing driver TDU, a redundant description thereof will be omitted.

Referring to FIG. 12, each of the plurality of second optical sensors PS2 may include a photoelectric conversion member PD and a touch sensing driver TDU that controls a sensing current according to a photoelectric current of the photoelectric conversion element PD. The photoelectric conversion element PD includes photo-sensing portions that sense external light. The touch sensing driver TDU may include a plurality of sensing transistors and various signal lines including the second scan line GWTL for controlling the sensing current generated by the photoelectric conversion element PD. The plurality of sensing transistors may include a first sensing transistor LT1, a second sensing transistor LT2, and a third sensing transistor LT3.

Since the photoelectric conversion elements PD, the first sensing transistor LT1, and the second sensing transistor LT2 are substantially the same as the photoelectric conversion elements PD, the first sensing transistor LT1, and the second sensing transistor LT2 of FIG. 11, a redundant description thereof will be omitted.

The third sensing transistor LT3 may be turned on by the sensing scan signal GWT of the second scan line GWTL to connect the second electrode of the first sensing transistor LT1 to the second read-out line ROL2. The gate electrode of the third sensing transistor LT3 may be connected to the second scan line GWTL, the first electrode thereof may be connected to the second electrode of the first sensing transistor LT1, and the second electrode thereof may be connected to the third node N3 and the second read-out line ROL2.

For example, in the first mode, when the photoelectric conversion element PD is connected to the second read-out line ROL2 according to the first sensing scan signal GWT1 of the second scan line GWTL, a sensing voltage may be accumulated at the third node N3 between the second read-out line ROL2 and the third sensing transistor LT3 in proportion to the voltage of the first node N1 in which the electric charges are accumulated. Accordingly, the user's fingerprint may be recognized. Alternatively, in the second mode, when the photoelectric conversion element PD is connected to the second read-out line ROL2 according to the second sensing scan signal GWT2 of the second scan line GWTL, a sensing voltage may be accumulated at the third node N3 between the second read-out line ROL2 and the third sensing transistor LT3 in proportion to the voltage of the first node N1 in which the electric charges are accumulated. Accordingly, the user's touch position may be sensed.

The second optical sensor PS2 may integrate the touch sensing and the fingerprint recognition, thus making it possible to recognize the user's touch position and authenticate the user's fingerprint without a separate touch panel and a separate fingerprint sensor.

Figure 13:
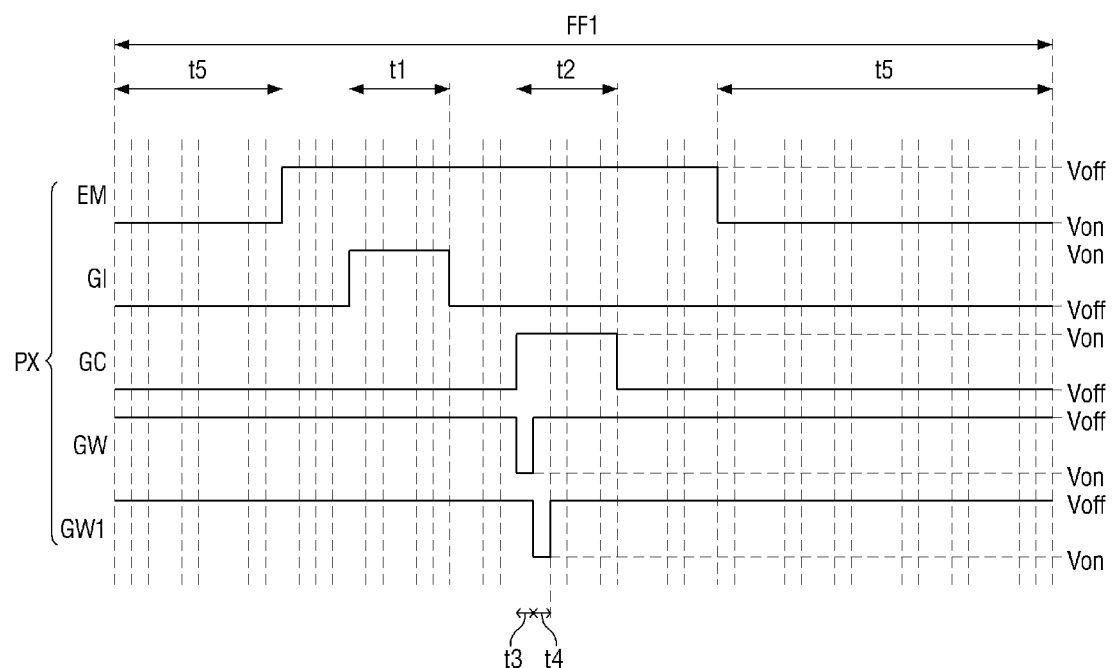
FIG. 13 is a timing diagram illustrating a scan signal, an emission signal, and the like according to an embodiment.

FIG. 13 is a timing diagram illustrating a scan signal, an emission signal, and the like according to an embodiment.

FIG. 13 is a timing diagram illustrating the operation of the pixel shown in FIG. 11.

Referring to FIG. 13, the emission signal EM, which is a signal applied to the emission line EML, may be a signal to turn-on and turn-off of the fourth transistor T4 and the fifth transistor T5. The scan start signal GI, which is a signal applied to the scan start line GIL, may be a signal to turn-on and turn-off of the third transistor T3. The scan control signal GC, which is a signal applied to the scan control line GCL, may be a signal to turn-on and turn-off of the second transistor T2. The first scan signal GW, which is a signal applied to the first scan line GWL, may be a signal to turn-on and turn-off of the first transistor T1 and the third sensing transistor LT3 of the first optical sensor PS1. The first scan signal GW1, which is a signal applied to the first scan line GWL1, may be a signal to turn-on and turn-off of the sixth transistor T6.

The emission signal EM, the scan start signal GI, the scan control signal GC, the first scan signal GW, and the first scan signal GW1 may have repeated signals with a cycle of one frame period. For example, when the display panel 10 is driven according to the first mode and the second mode, a first frame period may be a period corresponding to a first frame frequency FF1.

One period of the first frame frequency FF1 may be divided, according to the operation of the pixel PX, into a first period t1 in which the voltage of the gate electrode of the first transistor T1 may be initialized to a second initialization voltage VAINT; a second period t2 in which the data voltage may be supplied to the first electrode of the first transistor T1 and the threshold voltage of the first transistor T1 may be sampled; a third period t3 in which the data voltage may be supplied to the first electrode of the first transistor T1 and the threshold voltage of the first transistor T1 may be sampled; a fourth period t4 in which the voltage of the anode electrode of the light emitting element EL may be initialized to the first initialization voltage VINT; and a fifth period t5 in which the light emitting element EL may emit light.

The scan start signal GI may have a gate-on voltage Von during the first period t1, and may have a gate-off voltage Voff during the remaining periods. The scan control signal GC may have the gate-on voltage Von during the second period t2, and may have the gate-off voltage Voff during the remaining periods. The first scan signal GW may have the gate-on voltage Von during the third period t3, and may have the gate-off voltage Voff during the remaining periods. The first scan signal GW1 may have the gate-on voltage Von during the fourth period t4, and may have the gate-off voltage Voff during the remaining periods. The emission signal EM may have the gate-on voltage Von during the fifth period t5, and may have the gate-off voltage Voff during the remaining periods.

The gate-on voltage Von of the scan start signal GI and the scan control signal GC may be a gate high voltage, and the gate-off voltage Voff thereof may be a gate low voltage. The gate-on voltage Von of the first and first scan write signals GW and GW1 and the emission signal EM may be the gate low voltage, and the gate-off voltage Voff thereof may be the gate high voltage.

During the first period t1, the scan start signal GI having the gate-on voltage Von may be supplied to the scan start line GIL. During the second period t2, the scan control signal GC having the gate-on voltage Von may be supplied to the scan control line GCL. Accordingly, the first transistor T1 may be driven as a diode. During the third period t3, the first scan signal GW having the gate-on voltage Von may be supplied to the first scan line GWL. During the fourth period t4, the first scan signal GW1 having the gate-on voltage Von may be supplied to the first scan line GWL1. The emission signal EM having the gate-on voltage Von may be supplied to the emission line EML during the fifth period t5. Accordingly, the light emitting element EL may emit light.

Figure 14:
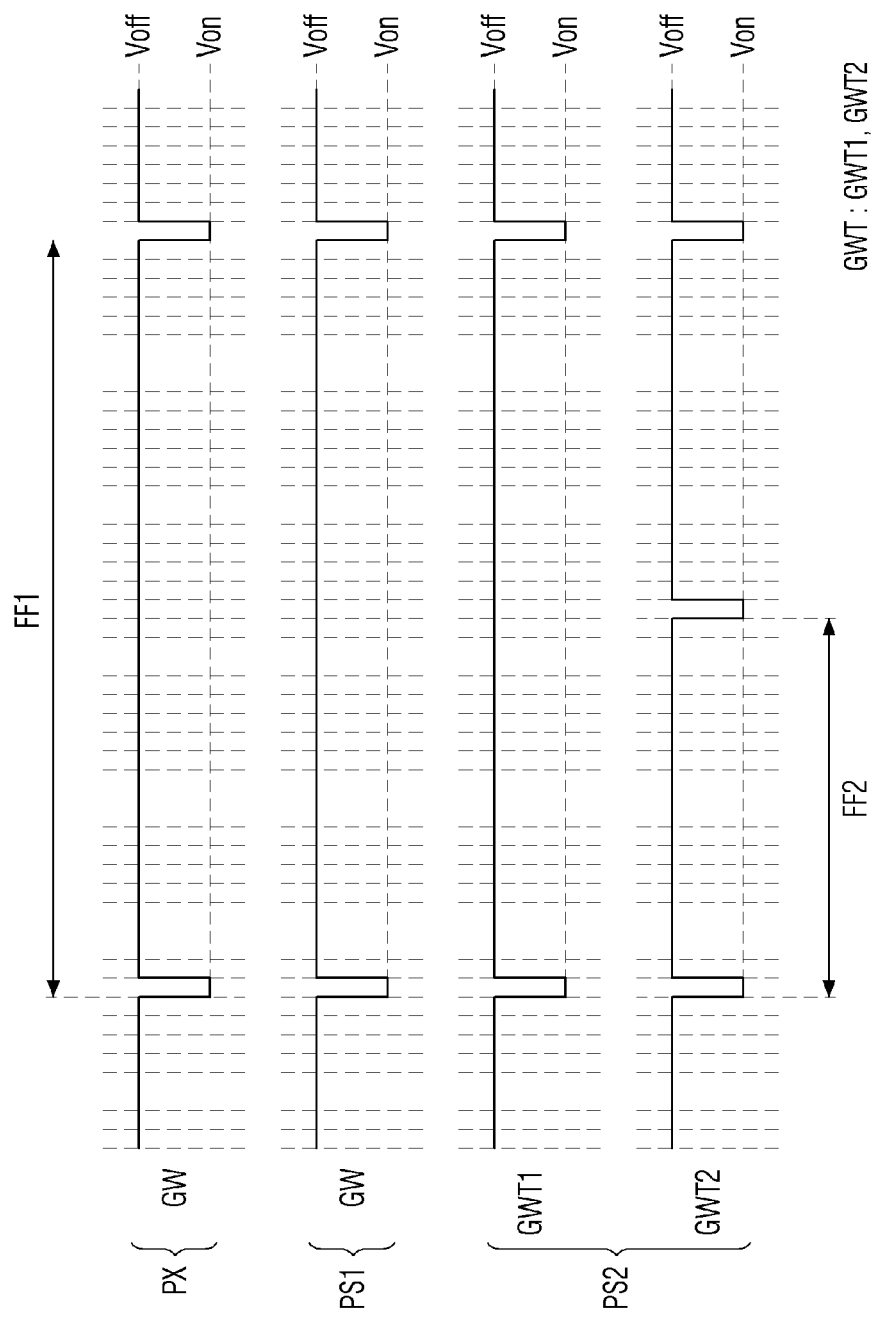
FIG. 14 is a timing diagram illustrating a first scan signal and a second scan signal according to an embodiment.

FIG. 14 is a timing diagram illustrating a first scan signal and a second scan signal according to an embodiment.

Referring to FIG. 14, as described above, the first scan signal GW may be applied to the first scan line GWL to turn-on and turn-off the third sensing transistor LT3 of the first optical sensor PS1. That is, the first optical sensor PS1 may receive the first scan signal GW having the first frame frequency. Accordingly, the first optical sensor PS1 may be driven at the first frame frequency.

When a user touches the display panel 10, the photoelectric conversion element PD of the first optical sensor PS1 may be exposed to external light emitted from the light emitting element EL during a light exposure period. Thereafter, the first scan signal GW having the gate-on voltage Von may be supplied to the first scan line GWL. Accordingly, the second sensing transistor LT2 may be turned on, and a fingerprint sensing signal corresponding to the current flowing through the first sensing transistor LT1 may be outputted to the fingerprint sensing line ROLL The current flowing through the first sensing transistor LT1 may be a source-drain current generated in proportion to the amount of the electric charges of the first node N1 input to the gate electrode of the first sensing transistor LT1. Accordingly, by sensing the voltage variation of the first node N1, a ridge or a valley of the fingerprint may be detected and the fingerprint may be recognized.

On the other hand, in the first mode, the first sensing scan signal GWT1 may be applied to the second scan line GWTL to turn-on and turn-off of the third sensing transistor LT3 of the second optical sensor PS2. The first sensing scan signal GWT1 may have the first frame frequency FF1. For example, when the second optical sensor PS2 is driven in the first mode, the first frame period may be a period corresponding to the first frame frequency FF1. Accordingly, the first scan signal GW and the first sensing scan signal GWT1 may have the same frame frequency.

In the second mode, the second sensing scan signal GWT2 may be applied to the second scan line GWTL to turn-on and turn-off of the third sensing transistor LT3 of the second optical sensor PS2. The second sensing scan signal GWT2 may have a second frame frequency FF2. For example, when the second optical sensor PS2 is driven in the second mode, the first frame period may be a period corresponding to the second frame frequency FF2. In addition, the second frame frequency FF2 may be different from the first frame frequency FF1. For example, the first frame frequency FF1 may be less than the second frame frequency FF2. The first frame frequency FF1 may be equal to or less than 120 Hz, and the second frame frequency FF2 may be larger than 120 Hz. Alternatively, the first frame frequency FF1 may be 120 Hz, and the second frame frequency FF2 may be 240 Hz.

FIG. 15 is a timing diagram illustrating a first scan signal and a second scan signal according to another embodiment.

FIG. 15 is different from than FIGS. 13 and 14 in that a third sensing scan signal GWT3 may be applied to the second scan line GWTL connected to the second optical sensor PS2. Therefore, a redundant description, which will be substantially the same as the description of embodiments of FIGS. 13 and 14, will be omitted.

Referring to FIG. 15, the third sensing scan signal GWT3 may be applied to the second scan line GWTL to turn-on and turn-off of the third sensing transistor LT3 of the second optical sensor PS2. The third sensing scan signal GWT3 may have the second frame frequency FF2. For example, when the second optical sensor PS2 is driven, the first frame period may be a period corresponding to the second frame frequency FF2. In addition, the second frame frequency FF2 may be different from the first frame frequency FF1. For example, the first frame frequency FF1 may be less than the second frame frequency FF2. The first frame frequency FF1 may be equal to or less than 120 Hz, and the second frame frequency FF2 may be larger than 120 Hz. Alternatively, the first frame frequency FF1 may be 120 Hz, and the second frame frequency FF2 may be 240 Hz.

As the third sensing scan signal GWT3 having the second frame frequency FF2 may be applied to the second scan line GWTL connected to the second optical sensor PS2, the user's touch position can be sensed according to the sensing signal of the second optical sensor PS2. For example, the first mode may occur when the second optical sensor PS2 is turned on at a same time as the first optical sensors PS1, and the second mode may occur when the second optical sensor PS2 is turned on at a time when the first optical sensors PS1 are turned off. Accordingly, the second optical sensor PS2 may serve to generate a second sensing signal according to external light so that the user's touch may be sensed by the sensing controller 50 at a time when the first optical sensors PS1 are turned off.

Figure 16:
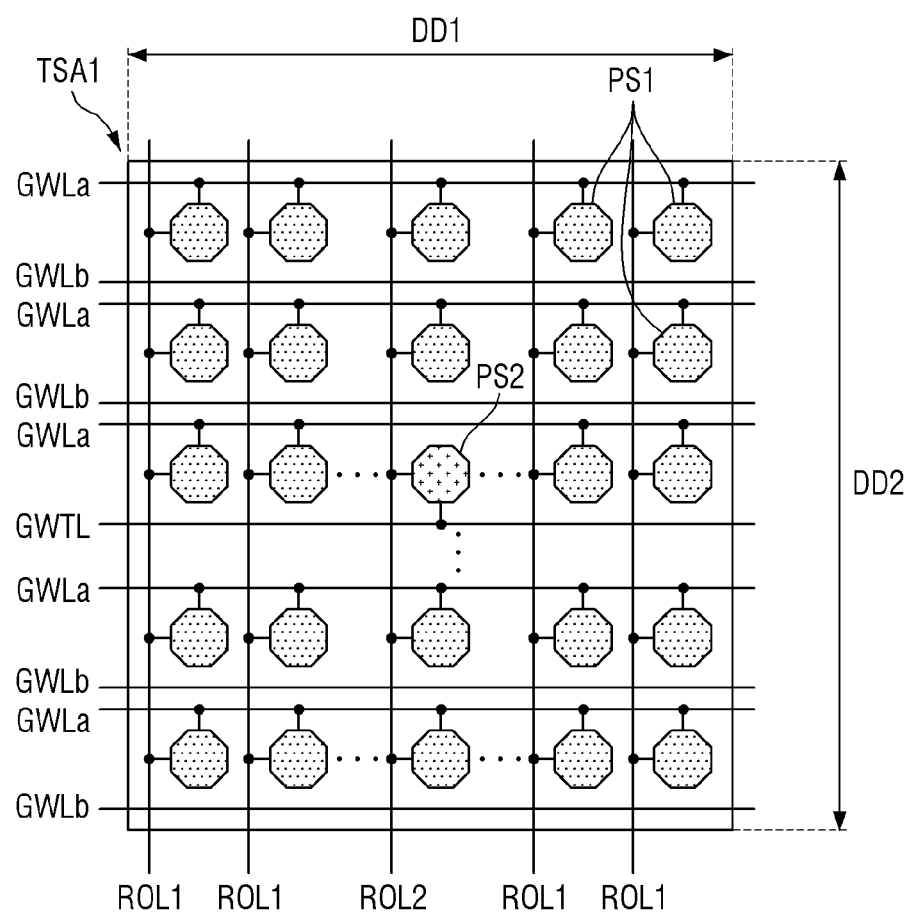
FIG. 16 is a plan view illustrating a first optical sensor and a second optical sensor according to still another embodiment.

FIG. 16 is a plan view illustrating a first optical sensor and a second optical sensor according to still another embodiment. Since FIG. 16 is substantially the same as FIG. 8 except for the first scan line GWL, a redundant description thereof will be omitted.

Referring to FIG. 16, the touch sensing unit TSA1 may include the plurality of first optical sensors PS1, the second optical sensors PS2, first-a scan lines GWLa, first-b scan lines GWLb, the second scan lines GWTL, and out-lines.

The first optical sensors PS1 may be arranged in a matrix in the first direction DR1 and the second direction DR2. Although not shown in the drawings, the first optical sensors PS1 and the plurality of pixels may be alternately arranged. The first optical sensors PS1 may serve to generate a first sensing signal according to external light so that a fingerprint may be recognized by the sensing controller 50.

The second optical sensor PS2 may be disposed at the center of the touch sensing unit TSA1, or may be disposed adjacent to a side of the touch sensing unit TSA1. The number of the second optical sensors PS2 may be less than the number of the plurality of first optical sensors PS1. Also, although not shown in the drawings, the number of the second optical sensors PS2 may be less than the number of the plurality of pixels. Accordingly, the second optical sensor PS2 of the touch sensing unit TSA1 may be surrounded by multiple first optical sensors PS1. In the first mode, the second optical sensors PS2 may serve to generate a second sensing signal according to external light so that the fingerprint may be recognized by the sensing controller 50. In the second mode, the second optical sensors PS2 may serve to generate a second sensing signal according to external light so that the user's touch may be sensed by the sensing controller 50.

The first scan lines GWL may include the first-a scan lines GWLa and the first-b scan lines GWLb.

The first-a scan lines GWLa may extend in the first direction DR1. The first-a scan lines GWLa may be arranged side-by-side in the second direction DR2. The plurality of first optical sensors PS1 and the second optical sensor PS2 may be disposed between the first-a scan lines GWLa. The first-a scan lines GWLa may be respectively connected to the plurality of pixels PX. The plurality of pixels PX may be connected to the first-a scan lines GWLa to receive the first scan signals GW.

The first-b scan lines GWLb may extend in the first direction DR1. The first-b scan lines GWLb may be arranged side-by-side in the second direction DR2. The plurality of first optical sensors PS1 and the second optical sensor PS2 may be disposed between the first-b scan lines GWLb. The first-b scan lines GWLb may be respectively connected to the plurality of first optical sensors PS1. The plurality of first optical sensors PS1 may be connected to the first-b scan lines GWLb to receive the first scan signals GW.

The second scan line GWTL may extend in the first direction DR1. The second scan line GWTL may be arranged in parallel with the first scan lines GWL. The second scan line GWTL may be disposed around the second optical sensor PS2. Since the second scan line GWTL is substantially the same as the second scan line GWTL of FIG. 8, a redundant description thereof will be omitted.

The first read-out lines ROL1 may extend in the second direction DR2. The first read-out lines ROL1 may be arranged side-by-side in the first direction DR1. The first read-out lines ROL1 may be disposed around the plurality of first optical sensors PS1 and the second optical sensor PS2. In addition, the second read-out line ROL2 may be disposed in the second direction DR2. The second read-out line ROL2 may be arranged in parallel with the first read-out lines ROL1. Since the first read-out line ROL1 and the second read-out line ROL2 are substantially the same as the first read-out line ROL1 and the second read-out line ROL2 of FIG. 8, a redundant description thereof will be omitted.

In an embodiment, as the first sensing scan signal GWT1 or the second sensing scan signal GWT2 may be applied to the second scan line GWTL in the single touch sensing unit TSA1, the second optical sensor PS2 can recognize the fingerprint and sense the touch. That is, the touch sensing and the fingerprint sensing may be integrated through the first optical sensors PS1 and the second optical sensor PS2. Therefore, the user's touch position may be sensed and the recognized fingerprint may be authenticated without needing to use a separate touch panel and a separate fingerprint sensor.

Figure 17:
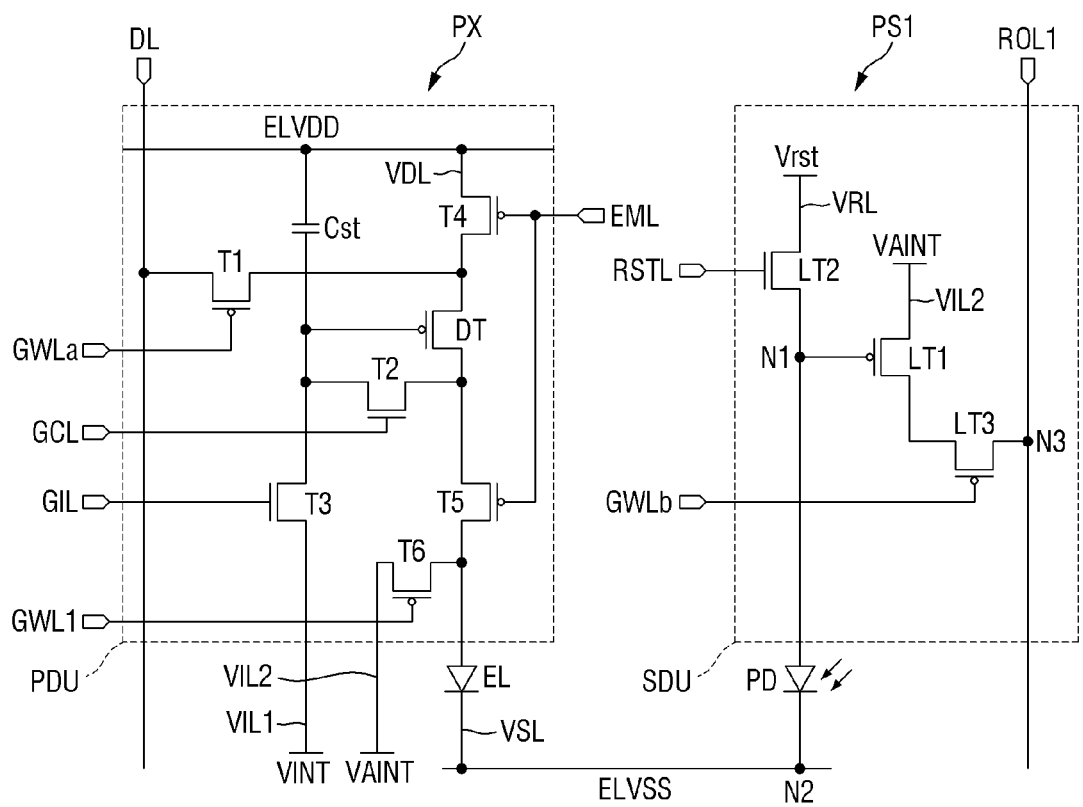
FIG. 17 is a circuit diagram illustrating a pixel and a first optical sensor according to still another embodiment.
Figure 18:
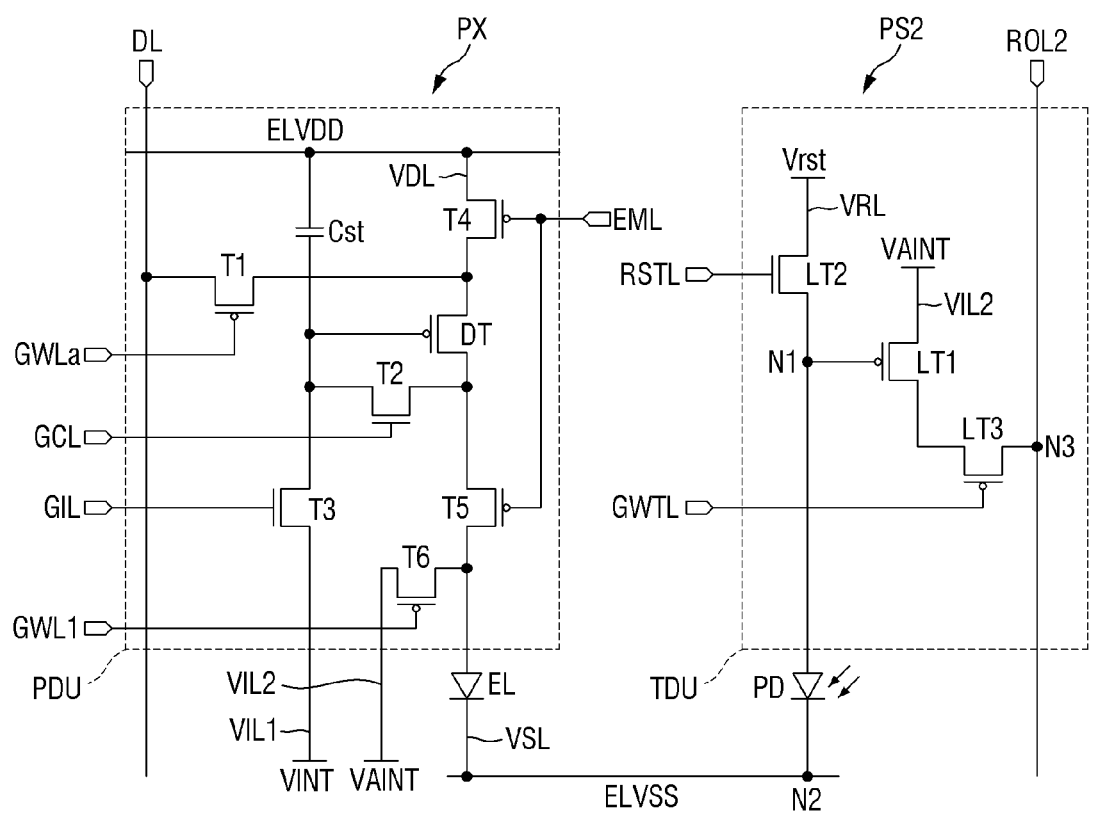
FIG. 18 is a circuit diagram illustrating a pixel and a second optical sensor according to still another embodiment.

FIG. 17 is a circuit diagram illustrating a pixel and a first optical sensor according to still another embodiment. FIG. 18 is a circuit diagram illustrating a pixel and a second optical sensor according to still another embodiment.

Since FIGS. 17 and 18 are substantially the same as FIG. 11 except for the first-b scan line GWLb connected to the gate electrode of the third transistor LT3 of the sensing driver SDU, a redundant description thereof will be omitted.

Referring to FIG. 17, the third sensing transistor LT3 of the first optical sensor PS1 may be turned on by the sensing scan signal GWT of the first-b scan line GWLb of the third sensing transistor LT3 to connect the second electrode of the first sensing transistor LT1 to the second read-out line ROL2. The gate electrode of the third sensing transistor LT3 may be connected to the first-b scan line GWLb, the first electrode thereof may be connected to the second electrode of the first sensing transistor LT1, and the second electrode thereof may be connected to the third node N3 and the second read-out line ROL2.

Referring to FIG. 18, the third sensing transistor LT3 of the second optical sensor PS2 may be turned on by the sensing scan signal GWT of the second scan line GWTL to connect the second electrode of the first sensing transistor LT1 to the second read-out line ROL2. The gate electrode of the third sensing transistor LT3 may be connected to the second scan line GWTL, the first electrode thereof may be connected to the second electrode of the first sensing transistor LT1, and the second electrode thereof may be connected to the third node N3 and the second read-out line ROL2.

For example, in the first mode, when the photoelectric conversion element PD is connected to the second read-out line ROL2 according to the first sensing scan signal GWT1 of the second scan line GWTL, a sensing voltage may be accumulated at the third node N3 between the second read-out line ROL2 and the third sensing transistor LT3 in proportion to the voltage of the first node N1 in which the electric charges are accumulated. Accordingly, the user's fingerprint may be recognized. In the second mode, when the photoelectric conversion element PD is connected to the second read-out line ROL2 according to the second sensing scan signal GWT2 of the second scan line GWTL, a sensing voltage may be accumulated at the third node N3 between the second read-out line ROL2 and the third sensing transistor LT3 in proportion to the voltage of the first node N1 in which the electric charges are accumulated. Accordingly, the user's touch position may be sensed.

In summary, the second optical sensor PS2 may integrate the touch sensing and the fingerprint recognition, thus making it possible to sense the user's touch position and authenticate the recognized fingerprint without a separate touch panel and a separate fingerprint sensor.

In concluding the detailed description, those skilled in the art will appreciate that many variations and modifications can be made to preferred embodiments without substantially departing from the principles of the present invention. Therefore, disclosed embodiments of the invention are used in a generic and descriptive sense only and not for purposes of limitation.

The invention claimed is:

1. A display device comprising:
a plurality of pixels configured to emit light;
a plurality of first optical sensors configured to sense the light;
a plurality of second optical sensors configured to sense the light;
a plurality of first scan lines respectively connected to the plurality of pixels and the plurality of first optical sensors;
a plurality of second scan lines respectively connected to the plurality of second optical sensors;
a first scan driver configured to output a first scan signal to each of the plurality of first scan lines;
a second scan driver, separate from the first scan driver, configured to output a second scan signal to each of the plurality of second scan lines;
a plurality of first read-out lines respectively connected to a first set of the plurality of first optical sensors; and
a plurality of second read-out lines respectively connected to a second set of the plurality of first optical sensors and the plurality of second optical sensors.

2. The display device of claim 1, wherein a number of the plurality of first optical sensors is greater than a number of the plurality of second optical sensors.

3. The display device of claim 1, wherein a number of the plurality of first scan lines is greater than a number of the plurality of second scan lines.

4. The display device of claim 1, wherein the first scan driver outputs the first scan signal having a first frame frequency to the plurality of first scan lines,
the second scan driver outputs the second scan signal having a second frame frequency to the plurality of second scan lines, and
the second frame frequency is higher than the first frame frequency.

5. The display device of claim 1, wherein in a first mode for recognizing a fingerprint when the plurality of first optical sensors and the plurality of second optical sensors are turned on at a same time according to the first scan signal and the second scan signal, and wherein in a second mode for sensing a touch position the plurality of second optical sensors are turned on at a time when the plurality of first optical sensors are turned off according to the first scan signal and the second scan signal.

6. The display device of claim 1, wherein the plurality of pixels, the plurality of first optical sensors, and the plurality of second optical sensors are arranged in a first direction and a second direction orthogonal to the first direction, and
any one of the plurality of second optical sensors is surrounded by the first optical sensors in the first direction and the second direction.

7. The display device of claim 1, further comprising:
a read-out circuit connected to the plurality of first read-out lines and the plurality of second read-out lines,
wherein the read-out circuit converts first sensing signals input from the first set and the second set of the plurality of first optical sensors into first sensing data in a first mode for recognizing a fingerprint, and converts second sensing signals input from the plurality of second optical sensors into second sensing data in a second mode for sensing a touch position; and
a sensing controller configured to recognize a fingerprint image according to the first sensing data in the first mode and sense a touch position according to the second sensing data in the second mode.

8. A display device comprising:
a plurality of pixels configured to emit light;
a plurality of first optical sensors configured to sense the light;
a plurality of second optical sensors configured to sense the light;
a plurality of first scan lines respectively connected to the plurality of pixels and the plurality of first optical sensors;
a plurality of second scan lines respectively connected to the plurality of second optical sensors;
a first scan driver configured to output a first scan signal to each of the plurality of first scan lines; and
a second scan driver configured to output a second scan signal to each of the plurality of second scan lines,
wherein the first scan driver outputs the first scan signal having a first frame frequency in a first mode for recognizing a fingerprint,
the second scan driver outputs the first scan signal having the first frame frequency in the first mode and outputs a second scan signal having a second frame frequency in the second mode, and the second frame frequency is higher than the first frame frequency.

9. The display device of claim 8, further comprising a timing controller configured to output the second scan signal having the second frame frequency to the second scan driver.

10. The display device of claim 8, wherein the first frame frequency is equal to or less than 120 Hz, and the second frame frequency is greater than 120 Hz.

11. The display device of claim 8, further comprising:
a plurality of first read-out lines respectively connected to the plurality of first optical sensors;
a plurality of second read-out lines respectively connected to the plurality of second optical sensors; and
a read-out circuit connected to the plurality of first read-out lines and the plurality of second read-out lines.

12. The display device of claim 11, wherein the read-out circuit converts first sensing signals input from the plurality of first read-out lines into first sensing data in the first mode, and converts second sensing signals input from the plurality of second read-out lines into second sensing data in the second mode.

13. The display device of claim 12, further comprising a sensing controller configured to recognize a fingerprint image according to the first sensing data in the first mode and sense a touch position according to the second sensing data in the second mode.

14. A display device comprising:
a timing controller configured to output a plurality of sensing scan control signals in a first mode and a second mode; and
a touch sensing area comprising a plurality of touch sensing units arranged in a first direction and a second direction orthogonal to the first direction,
wherein at least one of the plurality of touch sensing units comprises:
a plurality of pixels configured to emit light;
a plurality of first optical sensors configured to sense the light in the first mode; and
at least one second optical sensor configured to sense the light in the first mode and in the second mode,
wherein a number of the plurality of first optical sensors in the touch sensing area is greater than a number of the at least one second optical sensor in the touch sensing area, and
in the first mode the plurality of first optical sensors and the at least one second optical sensor are turned on at a same time, and in the second mode the at least one second optical sensor is turned on at a time when the plurality of first optical sensors are turned off.

15. The display device of claim 14, wherein the at least one second optical sensor is disposed at one of a center of the touch sensing unit and an edge of the touch sensing unit.

16. The display device of claim 14, wherein the at least one second optical sensor is surrounded by the plurality of first optical sensors in the first direction and the second direction.

17. The display device of claim 14, further comprising:
a read-out circuit configured to convert first sensing signals output by the first optical sensors into first sensing data and to convert second sensing signals output by the at least one second optical sensor; and
a sensing controller configured to recognize a fingerprint image according to the first sensing data and sense a touch position according to the second sensing data.

18. The display device of claim 14, further comprising:
a plurality of first scan lines respectively connected to the plurality of pixels;
a plurality of second scan lines respectively connected to the plurality of first optical sensors;
a plurality of third scan lines respectively connected to the at least one second optical sensor;
a first scan driver configured to output a first scan signal to each of the plurality of first scan lines and the plurality of second scan lines; and
a second scan driver configured to output a second scan signal to each of the plurality of third scan lines.

19. The display device of claim 18, wherein a number of the plurality of first scan lines is greater than a number of the plurality of third scan lines, and a number of the plurality of second scan lines is greater than the number of the plurality of third scan lines.

20. The display device of claim 18, wherein the first scan driver outputs the first scan signal having a first frame frequency to the plurality of first scan lines,
the second scan driver outputs the second scan signal having a second frame frequency to the plurality of second scan lines, and
the second frame frequency is higher than the first frame frequency.

* * * * *